US012757042B2

(12) United States Patent
Zheng et al.

(10) Patent No.: US 12,757,042 B2
(45) Date of Patent: Oct. 6, 2026

(54) SYSTEMS AND METHODS FOR NETWORK MANAGEMENT

(71) Applicant: Verizon Patent and Licensing Inc., Basking Ridge, NJ (US)

(72) Inventors: Zhou Zheng, Worcester, MA (US); Ivaylo Notchev, Rutland, MA (US); Khurram Abbas, Novi, MI (US); Haim S Ner, Fair Lawn, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 455 days.

(21) Appl. No.: 18/086,840

(22) Filed: Dec. 22, 2022

(65) Prior Publication Data

US 2024/0214843 A1 Jun. 27, 2024

(51) Int. Cl.

*H04W 24/08* (2009.01)
*H04L 43/10* (2022.01)
*H04L 45/00* (2022.01)
*H04W 28/06* (2009.01)

(52) U.S. Cl.

CPC ............. *H04W 24/08* (2013.01); *H04L 43/10* (2013.01); *H04L 45/14* (2013.01); *H04W 28/065* (2013.01)

(58) Field of Classification Search

CPC ............... H04W 24/08; H04W 28/065; H04W 72/1221; H04L 43/10; H04L 47/19; H04L 47/196; H04L 45/14; H04L 67/63; H04L 63/0464; H04L 9/3271

See application file for complete search history.

(56) References Cited

U.S. PATENT DOCUMENTS

| | | | | |
|---|---|---|---|---|
| 9,154,480 | B1 * | 10/2015 | Juels | H04L 9/3271 |
| 2003/0235308 | A1 * | 12/2003 | Boynton | H04L 63/0464 380/270 |
| 2004/0162076 | A1 * | 8/2004 | Chowdry | H04L 67/63 455/445 |
| 2011/0013680 | A1 * | 1/2011 | Fan | H04L 47/19 375/222 |
| 2019/0075586 | A1 * | 3/2019 | Xu | H04W 72/1221 |
| 2019/0158371 | A1 * | 5/2019 | Dillon | H04L 47/196 |
| 2020/0252201 | A1 * | 8/2020 | Sergeev | H04L 43/10 |
| 2023/0074703 | A1 * | 3/2023 | Hirasawa | H04L 45/14 |

* cited by examiner

*Primary Examiner* — Vinncelas Louis

(57) ABSTRACT

One or more computing devices, systems, and/or methods for network management are provided. In an example, a first node of a network determines a packet size modulation profile for use in generating identifiable data packets. The first node generates a first identifiable data packet addressed to a second node. The first node modulates a first packet size of a first data packet based upon the packet size modulation profile. The first node transmits the first identifiable data packet to the second node. The first node receives, from the second node, a second identifiable data packet corresponding to a reply to the first identifiable data packet. The first identifiable data packet and the second identifiable data packet are identifiable as a send-reply pair of data packets based upon the first packet size of the first identifiable data packet and a second packet size of the second identifiable data packet.

20 Claims, 13 Drawing Sheets

400

| Unencrypted Size | Encrypted Size |
|---|---|
| 105 | 200 |
| 106 | 204 |
| 107 | 208 |
| 108 | 212 |
| 109 | 216 |
| 110 | 220 |

FIG. 4

500

| Unencrypted Size | Encrypted Size |
|---|---|
| 95 | 184 |
| 96 | 188 |
| 97 | 192 |
| 98 | 196 |
| 99 | 200 |
| 100 | 204 |

FIG. 5

700

| Packet Size Pairs (Encrypted Sizes) | |
|---|---|
| Send | Receive |
| 200 | 184 |
| 204 | 188 |
| 208 | 192 |
| 212 | 196 |
| 216 | 200 |
| 220 | 204 |

FIG. 7

800

| Packet Size Pairs (Unencrypted Sizes) | |
|---|---|
| Send | Receive |
| 105 | 95 |
| 106 | 96 |
| 107 | 97 |
| 108 | 98 |
| 109 | 99 |
| 110 | 100 |

FIG. 8

900

| Pair | Tx Rx # | Number | Time | Source | Destination | Protocol | Unencrypted Payload Data Size | Encrypted Payload Size | Info |
|---|---|---|---|---|---|---|---|---|---|
| Pair 1 | Tx1 | 1 | 11.32106 | 145.182.4.21 | 182.262.1.65 | DTLSv1.2 | 105 | 200 | Application Data |
| | Rx1 | 2 | 11.36004 | 182.262.1.65 | 145.182.4.21 | DTLSv1.2 | 95 | 184 | Application Data |
| Pair 2 | Tx2 | 3 | 11.42108 | 145.182.4.21 | 182.262.1.65 | DTLSv1.2 | 106 | 204 | Application Data |
| | Rx2 | 4 | 11.46004 | 182.262.1.65 | 145.182.4.21 | DTLSv1.2 | 96 | 188 | Application Data |
| Pair 3 | Tx3 | 5 | 11.52107 | 145.182.4.21 | 182.262.1.65 | DTLSv1.2 | 107 | 208 | Application Data |
| | Rx3 | 6 | 11.56007 | 182.262.1.65 | 145.182.4.21 | DTLSv1.2 | 97 | 192 | Application Data |
| Pair 4 | Tx4 | 7 | 11.62104 | 145.182.4.21 | 182.262.1.65 | DTLSv1.2 | 108 | 212 | Application Data |
| | Rx4 | 8 | 11.65995 | 182.262.1.65 | 145.182.4.21 | DTLSv1.2 | 98 | 196 | Application Data |
| Pair 5 | Tx5 | 9 | 11.72105 | 145.182.4.21 | 182.262.1.65 | DTLSv1.2 | 109 | 216 | Application Data |
| | Rx5 | 10 | 11.77009 | 182.262.1.65 | 145.182.4.21 | DTLSv1.2 | 99 | 200 | Application Data |
| Pair 6 | Tx6 | 11 | 11.82105 | 145.182.4.21 | 182.262.1.65 | DTLSv1.2 | 110 | 220 | Application Data |
| | Rx6 | 12 | 11.86012 | 182.262.1.65 | 145.182.4.21 | DTLSv1.2 | 100 | 204 | Application Data |

FIG. 9

1100

| Pair | Tx Rx # | Number | Time | Source | Destination | Protocol | Packet Length | Encrypted Payload Size | Info |
|---|---|---|---|---|---|---|---|---|---|
| | | 16 | 11.040937940 | 145.182.4.21 | 182.262.1.65 | STUN | 78 | | Binding Indication |
| Pair 1 | Tx1 | 17 | 11.221120750 | 145.182.4.21 | 182.262.1.65 | DTLSv1.2 | 247 | 184 | Application Data |
| | Rx1 | 18 | 11.279963530 | 182.262.1.65 | 145.182.4.21 | DTLSv1.2 | 247 | 184 | Application Data |
| Pair 2 | Tx2 | 19 | 11.321064930 | 145.182.4.21 | 182.262.1.65 | DTLSv1.2 | 263 | 200 | Application Data |
| | Rx2 | 20 | 11.360036750 | 182.262.1.65 | 145.182.4.21 | DTLSv1.2 | 247 | 184 | Application Data |
| Pair 3 | Tx3 | 21 | 11.421084120 | 145.182.4.21 | 182.262.1.65 | DTLSv1.2 | 263 | 200 | Application Data |
| | Rx3 | 22 | 11.460041890 | 182.262.1.65 | 145.182.4.21 | DTLSv1.2 | 247 | 184 | Application Data |
| Pair 4 | Tx4 | 23 | 11.521067650 | 145.182.4.21 | 182.262.1.65 | DTLSv1.2 | 263 | 200 | Application Data |
| | Rx4 | 24 | 11.560073000 | 182.262.1.65 | 145.182.4.21 | DTLSv1.2 | 247 | 184 | Application Data |
| Pair 5 | Tx5 | 25 | 11.621038870 | 145.182.4.21 | 182.262.1.65 | DTLSv1.2 | 263 | 200 | Application Data |
| | Rx5 | 26 | 11.659945220 | 182.262.1.65 | 145.182.4.21 | DTLSv1.2 | 247 | 184 | Application Data |
| Pair 6 | Tx6 | 27 | 11.721053570 | 145.182.4.21 | 182.262.1.65 | DTLSv1.2 | 263 | 200 | Application Data |
| | Rx6 | 28 | 11.770086670 | 182.262.1.65 | 145.182.4.21 | DTLSv1.2 | 247 | 184 | Application Data |
| Pair 7 | Tx7 | 29 | 11.821053830 | 145.182.4.21 | 182.262.1.65 | DTLSv1.2 | 263 | 200 | Application Data |
| | Rx7 | 30 | 11.860115560 | 182.262.1.65 | 145.182.4.21 | DTLSv1.2 | 247 | 184 | Application Data |
| Pair 8 | Tx8 | 31 | 11.921094580 | 145.182.4.21 | 182.262.1.65 | DTLSv1.2 | 263 | 200 | Application Data |
| | Rx8 | 32 | 11.960046070 | 182.262.1.65 | 145.182.4.21 | DTLSv1.2 | 247 | 184 | Application Data |
| Pair 9 | Tx9 | 33 | 12.021090830 | 145.182.4.21 | 182.262.1.65 | DTLSv1.2 | 263 | 200 | Application Data |
| | Rx9 | 34 | 12.079984580 | 182.262.1.65 | 145.182.4.21 | DTLSv1.2 | 247 | 184 | Application Data |
| Pair 10 | Tx10 | 35 | 12.121038190 | 145.182.4.21 | 182.262.1.65 | DTLSv1.2 | 263 | 200 | Application Data |
| | Rx10 | 36 | 12.160048330 | 182.262.1.65 | 145.182.4.21 | DTLSv1.2 | 247 | 184 | Application Data |
| Pair 11 | Tx11 | 37 | 12.221065040 | 145.182.4.21 | 182.262.1.65 | DTLSv1.2 | 267 | 204 | Application Data |
| | Rx11 | 38 | 12.260019840 | 182.262.1.65 | 145.182.4.21 | DTLSv1.2 | 251 | 188 | Application Data |

FIG. 11

SYSTEMS AND METHODS FOR NETWORK MANAGEMENT

BACKGROUND

Wireless communication services, such as cellular services, wireless internet services, etc. may be used by organizations, companies, universities and other entities to interconnect people, machines, vehicles, sensors and other devices.

BRIEF DESCRIPTION OF THE DRAWINGS

While the techniques presented herein may be embodied in alternative forms, the particular embodiments illustrated in the drawings are only a few examples that are supplemental of the description provided herein. These embodiments are not to be interpreted in a limiting manner, such as limiting the claims appended hereto.

FIG. 4 is table showing example relationships between unencrypted data sizes and encrypted payload sizes in accordance with an embodiment.

FIG. 5 is table showing example relationships between unencrypted data sizes and encrypted payload sizes in accordance with an embodiment.

FIG. 7 is a table showing an example of a send-reply pair identification data structure in accordance with an embodiment.

FIG. 8 is a table showing an example of a send-reply pair identification data structure in accordance with an embodiment.

FIG. 9 is a table indicative of data associated with transmissions of data packets of a plurality of send-reply pairs of data packets in accordance with an embodiment.

FIG. 11 is a table indicative of data associated with transmissions of data packets of a plurality of send-reply pairs of data packets in accordance with an embodiment.

DETAILED DESCRIPTION OF EXAMPLE EMBODIMENTS

Figure 1:
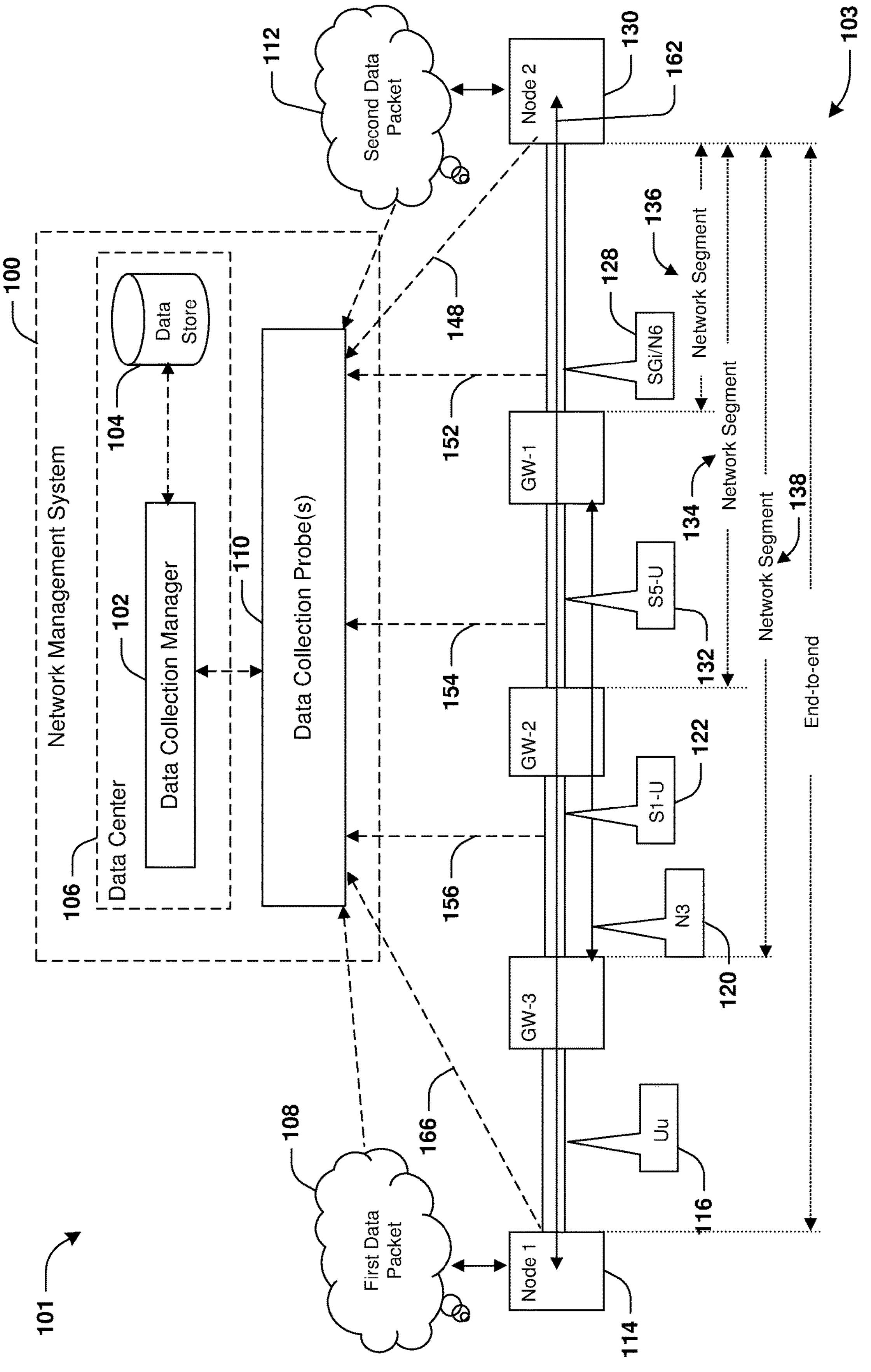
FIG. 1 is a diagram illustrating an example system comprising a network management system and/or a network in accordance with an embodiment.

Subject matter will now be described more fully hereinafter with reference to the accompanying drawings, which form a part hereof, and which show, by way of illustration, specific example embodiments. This description is not intended as an extensive or detailed discussion of known concepts. Details that are well known may have been omitted, or may be handled in summary fashion.

The following subject matter may be embodied in a variety of different forms, such as methods, devices, components, and/or systems. Accordingly, this subject matter is not intended to be construed as limited to any example embodiments set forth herein. Rather, example embodiments are provided merely to be illustrative. Such embodiments may, for example, take the form of hardware, software, firmware or any combination thereof.

The following provides a discussion of some types of scenarios in which the disclosed subject matter may be utilized and/or implemented.

One or more systems and/or techniques for determining network performance metrics and/or managing networks are provided. A network management system may be tasked with implementing performance testing of a network to determine performance metrics (e.g., latency, jitter, packet loss, packet retransmission, out-of-order (OOO) packet transmission, bandwidth, etc.) associated with data packet transmissions over the network. In order to determine the performance metrics, the network may need to identify send-reply pairs of data packets from network traffic over the network. A send-reply pair of data packets may comprise (i) a send data packet sent by a first node (e.g., a User Equipment (UE)) to a second node (e.g., an application server), and (ii) a reply data packet sent by the second node to the first node in response to the send data packet. However, identifying send-reply pairs becomes complex when the network traffic (e.g., 5G traffic, Web Real-Time Communication (WebRTC) traffic, etc.) is encrypted. For example, in some systems, matching send data packets to their corresponding reply data packets may not be possible since encryption of the data packets prevents visibility into a corresponding data stream, thus making the data packets unidentifiable by the network management system.

Accordingly, as provided herein, packet sizes of the data packets are modulated to serve as matching identifiers used to match send data packets to reply data packets. In an example, a first node of a network may modulate a first packet size of a send data packet based upon a packet size modulation profile. The first node may transmit the send data packet, over the network, to a second node (e.g., a destination of the send data packet), which may transmit a reply data packet to the first node in response to receiving the send data packet. A second packet size of the reply data packet may be based upon (e.g., may be equal to and/or a function of) the first packet size of the send data packet. The send data packet and the reply data packet may be identifiable as a send-reply pair of data packets using the first packet size and the second packet size. For example, the network management system may match the send data packet to the reply data packet by comparing the first packet size and the second packet size with a send-reply pair identification data structure. The network management system may determine that the first identifiable data packet and the second identifiable data packet are a send-reply pair of data packets based upon a determination that the first packet size and the second packet size match a pair of packet sizes indicated by the send-reply pair identification data structure.

The first packet size and the second packet size may be indicated by unencrypted headers of the send data packet and the reply data packet, respectively. Accordingly, using the techniques provided herein, the send data packet and the reply data packet may be identifiable (e.g., since the first packet size and the second packet size are visible in the unencrypted headers) and may be matched with each other (even when respective payloads of the send data packet and the reply data packet are encrypted). Thus, in accordance with one or more of the techniques provided herein, send-reply pairs of data packets may be identified without requiring use of encryption keys by the network management system, and/or without reducing an encryption level and/or security level of the data packets.

The network management system may determine timestamps associated with the send data packet and the reply data packet, and may use the timestamps to determine performance metrics associated with the network. The timestamps may be determined using data collection probes that intercept and/or collect data packets at various points along a network path through which the send data packet and the reply data packet are transmitted. The performance metrics may comprise end-to-end performance metrics associated with end-to-end transmission of the send data packet and/or the reply data packet (e.g., transmission over the entirety of the network path). Alternatively and/or additionally, the performance metrics may comprise network segment performance metrics associated with network segments of the network (e.g., segments of the network path). The performance metrics may comprise (i) a latency metric, (ii) a jitter metric, (iii) a packet loss metric, (iv) a packet retransmission metric, (v) an OOO packet transmission metric, (vi) a bandwidth metric, and/or (vii) one or more other performance metrics.

In some examples, based upon the performance metrics, the network management system may perform one or more actions to improve network performance associated with the first node, the second node and/or an application (e.g., a gaming application, a virtual reality application, etc.) hosted on the second node (e.g., an application server). For example, the one or more actions may comprise modifying one or more parameters (e.g., QoS parameters, charging parameters, etc.) of one or more components of the network. Alternatively and/or additionally, the one or more actions may comprise (i) identifying a malfunctioning network segment based upon the network segment performance metrics, (ii) deploying one or more resources to one or more components (e.g., malfunctioning components) of the malfunctioning network segment, (iii) reconfiguring, repairing and/or replacing the one or more components, (iv) performing a software update for the one or more components, and/or (v) transmitting information, associated with the malfunctioning network segment, to a network maintenance device associated with a network maintenance agent (e.g., a person, a robot, etc. tasked with repairing and/or performing maintenance for network components of the malfunctioning network segment).

FIG. 1 illustrates an example of a system 101 comprising a network management system 100 and/or a network 103. The network 103 may comprise a first node 114 "Node 1", a second node 130 "Node 2", and/or one or more intermediate nodes between the first node 114 and the second node 130. In an example, the first node 114 may comprise a client device, such as a UE. The second node 130 may comprise a computer (e.g., a server), such as an application computer (e.g., an application server) that hosts resources of a first application. In an example, the first node 114 (e.g., the client) may communicate with the second node 130 over the network 103 to be provided with one or more resources of the first application. The first application may comprise at least one of a gaming application, a virtual reality application, a video calling application, a voice-calling application, etc. In an example, the second node 130 may comprise a Multi-Access Edge Computing (MEC) device that runs the first application. The network 103 may comprise a wireless network, such a 3G network, a 4G network, a 5G network and/or other type of network. The one or more intermediate nodes may comprise a first gateway "GW-1" (e.g., a Packet Network Data Gateway (PGW)), a second gateway "GW-2" (e.g., a Serving Gateway (SGW)), a third gateway "GW-3" (e.g., an e-NodeB (eNB), a g-NodeB (gNB), etc.), and/or one or more other nodes. Communications between the first node 114 and the second node 130 may be performed through a network path 162 through the one or more intermediate nodes.

Nodes in the network 103 may communicate with each other using one or more first interfaces comprising (i) a Universal Mobile Telecommunications System (UMTS) air interface 116 (which may also be referred to as "Uu Interface") used for communication between the first node 114 (e.g., the UE) and GW-3 (e.g., eNB, gNB, etc.), (ii) an N3 interface 120 used for communication between GW-3 (e.g., eNB, gNB, etc.) and GW-1 (e.g., PGW), (iii) an S1-U interface 122 used for communication between GW-3 (e.g., eNB, gNB, etc.) and GW-2 (e.g., SGW), (iv) an S5-U interface 132 used for communication between GW-2 (e.g., SGW) and GW-1 (e.g., PGW), (v) an interface 128, comprising SGi interface (e.g., for 4G) and/or N6 interface (e.g., for 5G), for communication between GW-1 and the second node 130, and/or (vi) one or more other interfaces.

Packet sizes (e.g., payload sizes, total packet lengths, etc.) of data packets sent by the first node 114 and/or the second node 130 may be modulated to generate identifiable data packets with modulated packet sizes (e.g., unique packet sizes) that enable the network management system 100 to identify send-reply pairs of data packets between the first node 114 and the second node 130. That is, packet sizes of the data packets may serve as matching identifiers used by the network management system 100 to match send data packets to corresponding reply data packets. The network management system 100 may determine timestamps associated with identified send-reply pairs of data packets, and determine performance metrics associated with the network 103 based upon the timestamps.

In some examples, the first node 114 may determine a first packet size modulation profile for use in generating identifiable data packets. The network management system 100 may configure the first node 114 with the first packet size modulation profile (e.g., the network management system 100 may transmit the first packet size modulation profile to the first node 114). Alternatively and/or additionally, the first node 114 may configure the first packet size modulation profile, and/or may transmit an indication of the first packet size modulation profile to the network management system 100. In some examples, both the first node 114 and the network management system 100 are aware of the first packet size modulation profile (e.g., the first packet size modulation profile may be stored in memory of both the first node 114 and the network management system 100).

In some examples, the first packet size modulation profile may be indicative of a sequence of packet sizes (e.g., payload sizes, total packet lengths, etc.). For example, the first node 114 may generate a data packet (addressed to the second node 130, for example) to have a packet size of the sequence of packet sizes. The first node 114 may cycle through packet sizes of the sequence of packet sizes to generate subsequent data packets addressed to the second node 130. In an example, the sequence of packet sizes indicated by the first packet size modulation profile may comprise {200 bytes, 202 bytes, 204 bytes, 206 bytes}, and, according to the sequence of packet sizes, the first node 114 may (i) modulate a packet size of a first data packet (addressed to the second node 130, for example) to be 200 bytes, (ii) modulate a packet size of a second data packet (addressed to the second node 130, for example) to be 202 bytes, (iii) modulate a packet size of a third data packet (addressed to the second node 130, for example) to be 204 bytes, and/or (iv) modulate a packet size of a fourth data packet (addressed to the second node 130, for example) to be 206 bytes. The first node 114 may generate data packets with packet sizes according to an order of the sequence of packet sizes indicated by the first packet size modulation profile (e.g., the first data packet of 200 bytes may be followed by the second data packet of 202 bytes, which may be followed by the third data packet of 204 bytes, which may be followed by the fourth data packet of 206 bytes).

In some examples, the first packet size modulation profile may be indicative of a function (e.g., a step function, a linear function, etc.) and/or an initial value. The first node 114 may generate data packets (addressed to the second node 130, for example) having packet sizes according to the function and/or the initial value.

In a first example, the function may comprise an increment function associated with increasing a value of a packet size of a previous data packet by an increment value (e.g., one, two, or other value) to determine a packet size of a next data packet. In an example in which the increment value is one and the initial value is 200, the first node 114 may (i) modulate a packet size of a first data packet (addressed to the second node 130, for example) to be 200 bytes (e.g., the initial value), (ii) modulate a packet size of a second data packet (addressed to the second node 130, for example), that is subsequent to the first data packet, to be 201 bytes (e.g., 200+1), (iii) modulate a packet size of a third data packet (addressed to the second node 130, for example), that is subsequent to the second data packet, to be 202 bytes (e.g., 201+1), (iv) modulate a packet size of a fourth data packet (addressed to the second node 130, for example), that is subsequent to the third data packet, to be 203 bytes (e.g., 202+1), etc.

In a second example, the function may comprise a decrement function associated with decreasing a value of a packet size of a previous data packet by a decrement value (e.g., one, two, or other value) to determine a packet size of a next data packet.

Other functions, configurations, etc. of the first packet size modulation profile are within the scope of the present disclosure.

Figure 2:
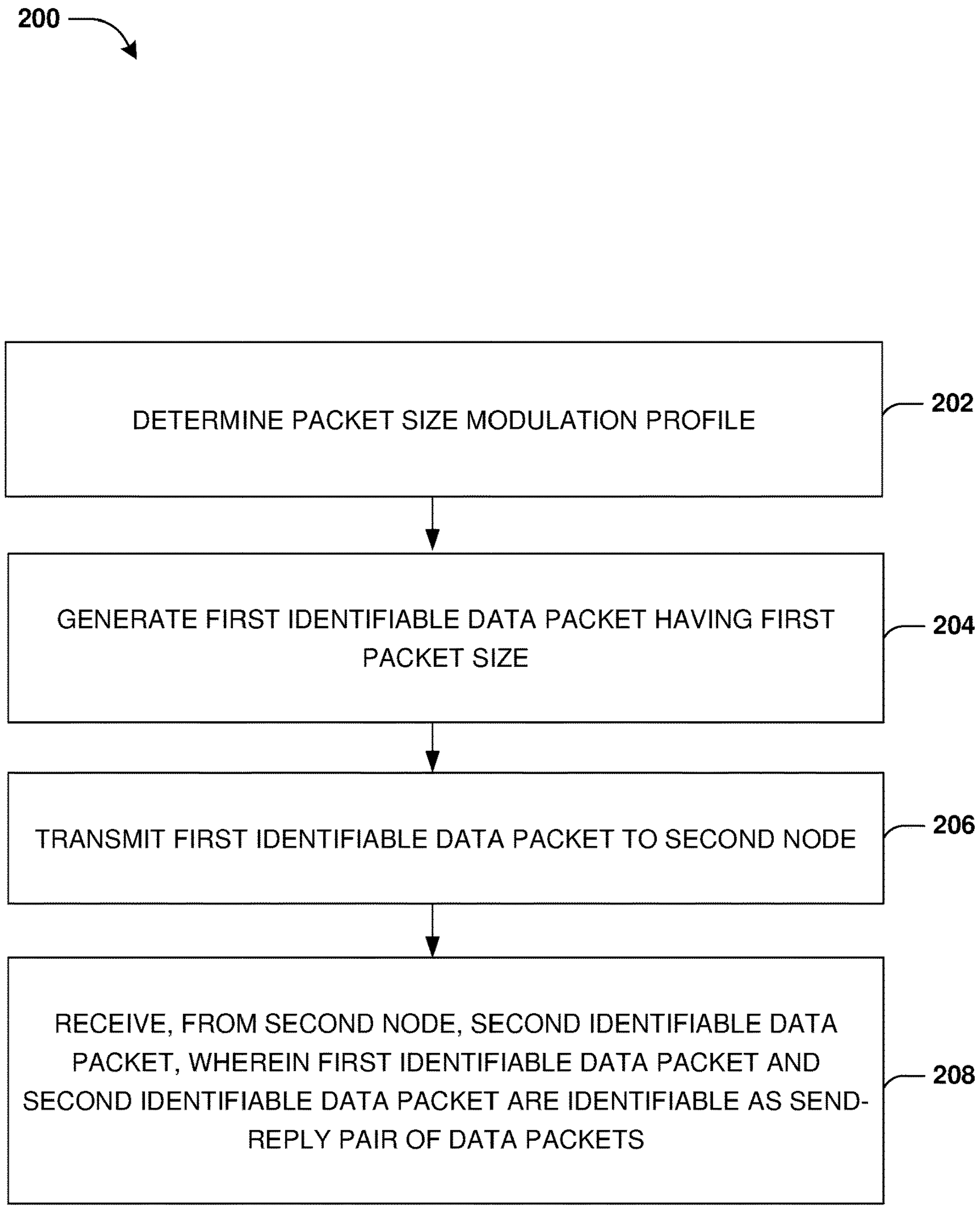
FIG. 2 is a flow chart illustrating an example method for modulating packet sizes of data packets in accordance with an embodiment.

An embodiment of modulating packet sizes of data packets is illustrated by an example method 200 of FIG. 2, and is further described in conjunction with FIG. 1. At 202, the first node 114 (shown in FIG. 1) may determine the first packet size modulation profile. At 204, the first node 114 may generate, based upon the first packet size modulation profile, a first identifiable data packet having a first packet size. For example, the first node 114 may modulate the first packet size of the first identifiable data packet based upon the first packet size modulation profile (e.g., based upon at least one of the sequence of packet sizes, the function, etc. indicated by the first packet size modulation profile). At 206, the first node 114 may transmit the first identifiable data packet over the network 103 to the second node 130. For example, the first identifiable data packet may be sent through the network path 162 (e.g., through the one or more intermediate nodes in the network 103) to the second node 130. At 208, the first node 114 may receive, from the second node 130, a second identifiable data packet. The second identifiable data packet may correspond to a reply to the first identifiable data packet. The second identifiable data packet may be sent through the network path 162 (e.g., through the one or more intermediate nodes in the network 103) to the first node 114. The first identifiable data packet and the second identifiable data packet may be identifiable as a send-reply pair of data packets based upon the first packet size of the first identifiable data packet and a second packet size of the second identifiable data packet.

In some examples, the first identifiable data packet (sent by the first node 114) may comprise a header and a payload. The first node 114 may include an indication of the first packet size in a header of the first identifiable data packet. The header of the first identifiable data packet may be unencrypted (e.g., readable without an encryption key). Alternatively and/or additionally, the second node 130 may include an indication of the second packet size in a header of the second identifiable data packet, wherein the header of the second identifiable data packet may be unencrypted (e.g., readable without an encryption key). Thus, even in examples in which payloads of the first identifiable data packet and/or the second identifiable data packet are encrypted, the indication of the first packet size and/or the indication of the second packet size may be visible and/or readable (by the network management system 100 and/or the one or more intermediate nodes in the network 103, for example) without requiring use of an encryption key.

Figure 3A:
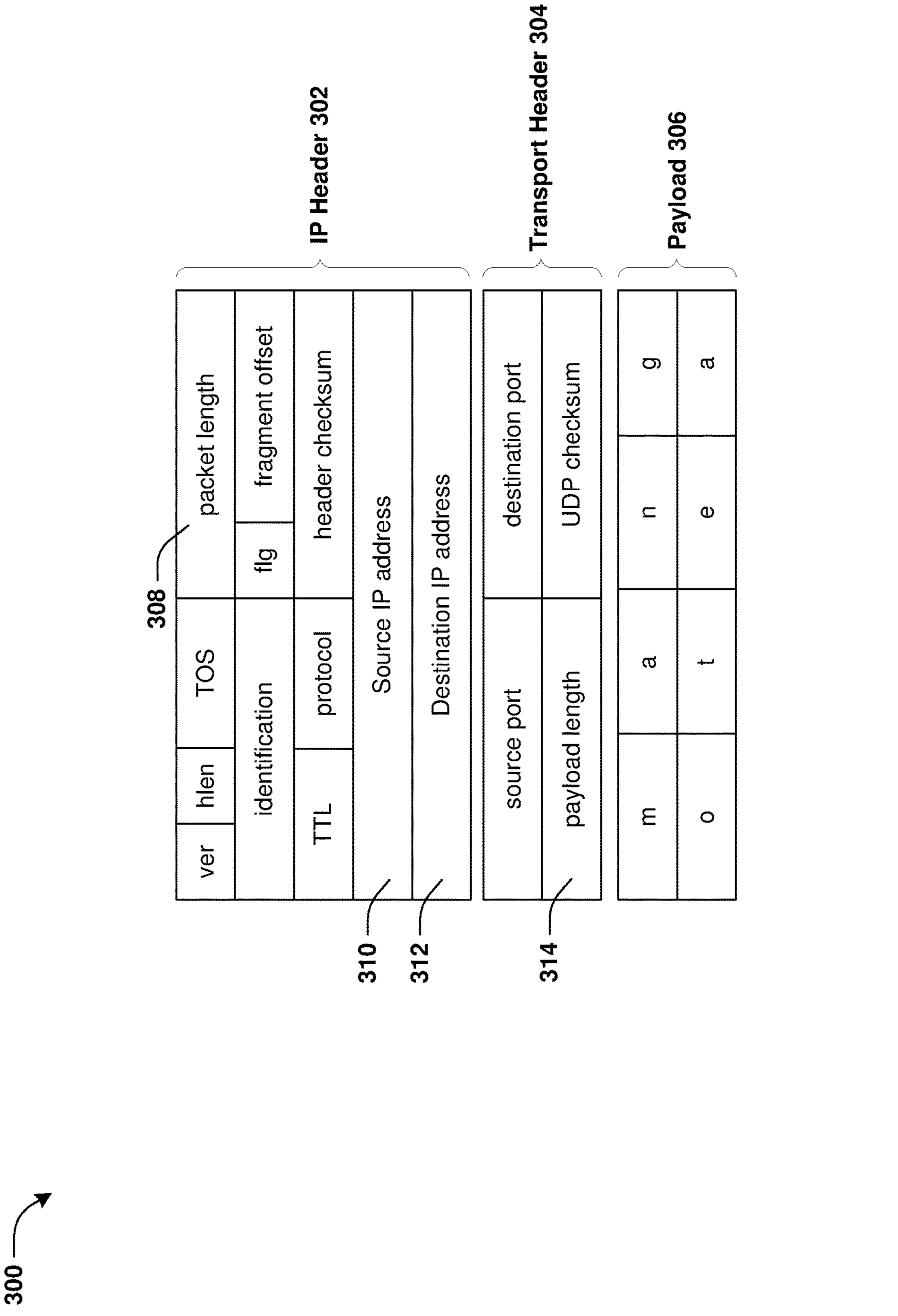
FIG. 3A illustrates an example packet datagram structure of a data packet in accordance with an embodiment.
Figure 3B:
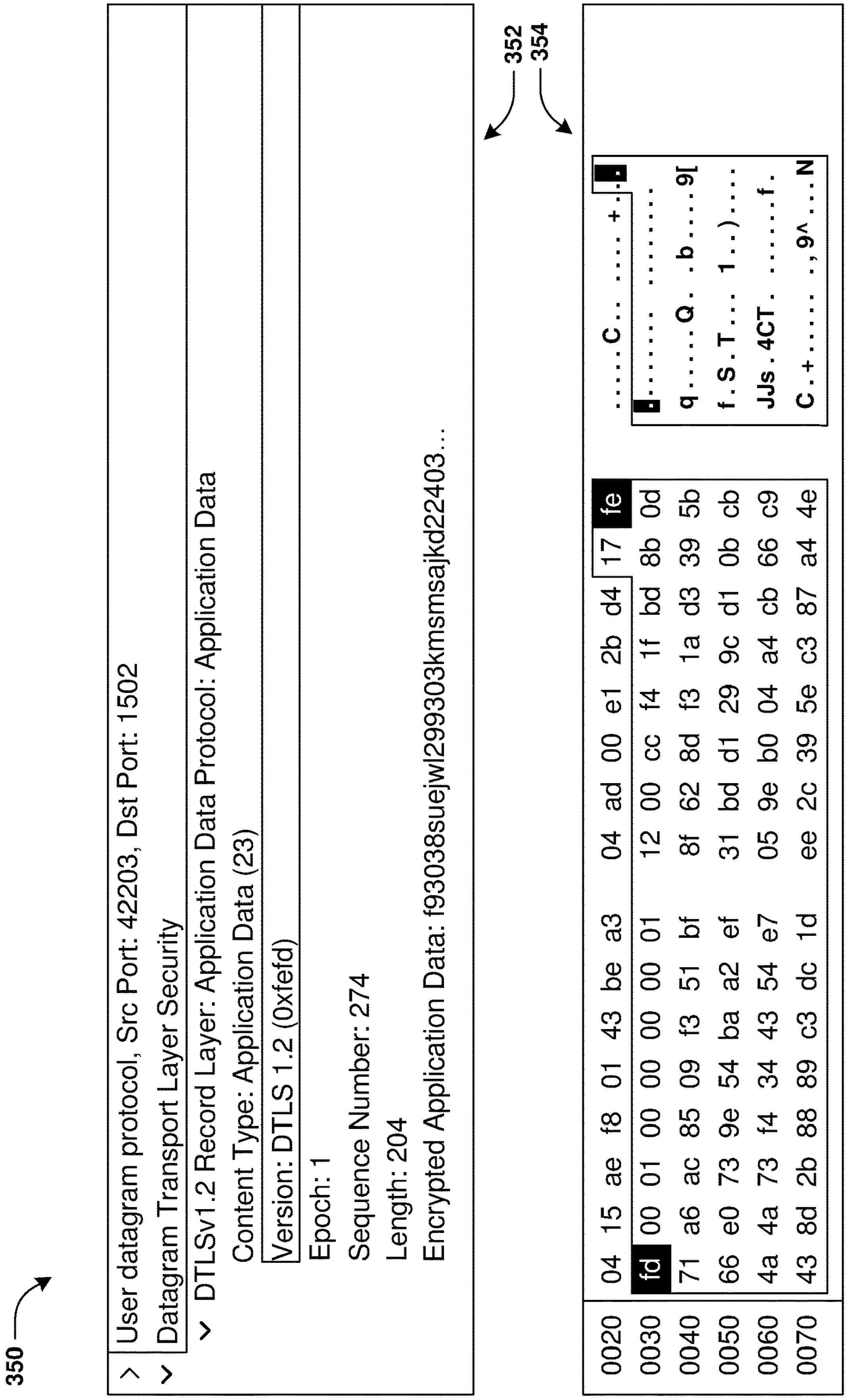
FIG. 3B illustrates a representation of an example data packet in accordance with an embodiment.

FIG. 3A illustrates an example packet datagram structure 300 of data packets (e.g., the first identifiable data packet, the second identifiable data packet, etc.) sent by the first node 114 and/or the second node 130. The example packet datagram structure 300 may comprise one or more headers and/or a payload 306. The one or more headers may comprise an internet protocol (IP) header 302 and/or a transport header 304 (e.g., a protocol header, such as at least one of a User Datagram Protocol (UDP) header, a Transmission Control Protocol (TCP) header, etc.). In some examples, the one or more headers may be unencrypted (e.g., readable without an encryption key), and the payload 306 may be encrypted (e.g., readable with an encryption key). The IP header 302 may comprise a total length field 308 indicative of a total length (e.g., a total size) of a data packet, a source field 310 indicative of a source IP address (e.g., an IP address of a sender of the data packet), and/or a destination field 312 indicative of a destination IP address (e.g., an IP address to which the data packet is addressed). The transport header 304 may comprise a payload length field 314 indicative of a length (e.g., a size) of the payload 306 (e.g., an encrypted payload). FIG. 3B illustrates a representation of an example data packet 350 (e.g., the first identifiable data packet, the second identifiable data packet, etc.) sent by the first node 114 and/or the second node 130. The example data packet 350 may comprise one or more headers 352 (e.g., a transport header and/or an IP header) and/or an encrypted payload 354.

In an example, the first packet size and/or the second packet size may correspond to payload sizes of encrypted payloads of the first identifiable data packet and the second identifiable data packet, respectively. For example, the first packet size of the first identifiable data packet may be indicated by a payload length value included in a payload length field (e.g., the payload length field 314) in a transport header (e.g., the transport header 304) of the first identifiable data packet. Alternatively and/or additionally, the second packet size of the second identifiable data packet may be indicated by a payload length value included in a payload length field (e.g., the payload length field 314) in a transport header (e.g., the transport header 304) of the second identifiable data packet.

Embodiments are contemplated in which the first packet size and/or the second packet size correspond to total sizes (e.g., total lengths) of the first identifiable data packet and the second identifiable data packet, respectively. For example, the first packet size of the first identifiable data packet may be indicated by a total length value included in a total length field (e.g., the total length field 308) in an IP header (e.g., the IP header 302) of the first identifiable data packet. Alternatively and/or additionally, the second packet size of the second identifiable data packet may be indicated by a total length value included in a total length field (e.g., the total length field 308) in an IP header (e.g., the IP header 302) of the second identifiable data packet.

In an example, the first packet size corresponds to a size of a first encrypted payload (e.g., the payload 306) in the first identifiable data packet. The first node 114 may generate the first identifiable data packet by (i) determining a first set of bytes for delivery to the second node 130 (e.g., the first set of bytes may comprise at least some of a set of data that is available for transmission to the second node 130), (ii) determining a first target packet size (e.g., a target value of the first packet size of the first identifiable data packet) based upon the first packet size modulation profile, (iii) appending one or more additional bytes, to the first set of bytes, to generate a second set of bytes for delivery to the second node 130 (e.g., the one or more additional bytes may be appended to the beginning of the first set of bytes, to the end of the first set of bytes, and/or between bytes of the first set of bytes), (iv) encrypting the second set of bytes to generate the first encrypted payload, and/or (v) generating the first identifiable data packet comprising the first encrypted payload.

A quantity of bytes of the one or more additional bytes appended to the first set of bytes may be determined based upon the first target packet size. For example, the quantity of bytes of the one or more additional bytes may be determined such that appending the one or more additional bytes to the first set of bytes results in the first packet size of the first identifiable data packet being equal to the first target packet size determined using the first packet size modulation profile. In an example in which the first target packet size corresponds to a size of the first encrypted payload, the quantity of bytes of the one or more additional bytes may be determined such that appending the one or more additional bytes to the first set of bytes results in the size of the first encrypted payload (generated by encrypting the second set of bytes comprising the first set of bytes and the one or more additional bytes) being equal to the first target packet size.

In some examples, the size of the first encrypted payload (e.g., a quantity of bytes of the first encrypted payload) is different than an unencrypted data size of the second set of bytes (e.g., the unencrypted data size may correspond to the quantity of bytes of the second set of bytes before the second set of bytes is encrypted to generate the first encrypted payload). A relationship between the size of the first encrypted payload and the unencrypted data size of the second set of bytes may depend upon an encryption configuration used by the first node 114 to encrypt the second set of bytes to generate the first encrypted payload. Different encryption configurations may have different relationships between the size of the first encrypted payload and the unencrypted data size of the second set of bytes.

FIG. 4 illustrates a table 400 showing example relationships between the unencrypted data size of the second set of bytes and the size of the first encrypted payload. The table 400 may correspond to an encrypted data size dictionary associated with an exemplary encryption configuration used by the first node 114 to encrypt the second set of bytes. In the table 400, various values of the unencrypted data size of the second set of bytes (that are encrypted to generate the first encrypted payload) are provided in an "Unencrypted Size" column, and various values of the size of the first encrypted payload are provided in an "Encrypted Size" column. According to the example shown in FIG. 4, encrypting the second set of bytes results in generation of an encrypted set of bytes having a larger size. For example, when the unencrypted data size of the second set of bytes is equal to 105 bytes, encrypting the second set of bytes generates the first encrypted payload having a size equal to 200 bytes. Alternatively and/or additionally, when the unencrypted data size of the second set of bytes is equal to 106 bytes, encrypting the second set of bytes generates the first encrypted payload having a size equal to 204 bytes. Other example relationships are shown in the table 400.

In an example, the first set of bytes may be 90 bytes, and the first target packet size may be 200 bytes, wherein the first target packet size corresponds to a target size of the first encrypted payload. Accordingly, the one or more additional bytes may have a quantity that results in the first encrypted payload having 200 bytes. The quantity of bytes of the one or more additional bytes may be determined to be a value, k. Accordingly, the second set of bytes may comprise 90+k bytes. According to the table 400 shown in FIG. 4, the target size of the first encrypted payload (e.g., 200 bytes) may be achieved when the second set of bytes includes 105 bytes. Accordingly, the quantity of bytes of the one or more additional bytes may be determined to be k=105−90 bytes=15 bytes. Thus, the first node 114 may append 15 bytes to the first set of bytes (e.g., 90 bytes) to generate the second set of bytes (e.g., 105 bytes), which may then be encrypted to generate the first encrypted payload having the target size (e.g., 200 bytes).

Other relationships between the quantity of bytes of the second set of bytes and the size of the first encrypted payload are within the scope of the present disclosure. For example, the size of the first encrypted payload may be smaller than or equal to the quantity of bytes of the second set of bytes (depending upon an encryption configuration used to encrypt the second set of bytes, for example).

Embodiments are contemplated in which the first target packet size corresponds to a target size of the unencrypted data size of the second set of bytes (rather than the size of the first encrypted payload, for example). For example, the quantity of bytes of the one or more additional bytes (to be appended to the first set of bytes to generate the second set of bytes) may correspond to a difference between the target size and the quantity of bytes of the first set of bytes. Accordingly, in an example in which the quantity of bytes of the first set of bytes is 100 bytes, and the target size of the unencrypted data size of the second set of bytes is 110 bytes, the quantity of bytes of the one or more additional bytes may be determined to be 10 bytes (e.g., 110−100=10 bytes). Thus, 10 additional bytes may be appended to the first set of bytes to generate the second set of bytes, and the second set of bytes (comprising the first set of bytes and the 10 additional bytes) may be encrypted to generate the first encrypted payload.

The second node 130 may transmit the second identifiable data packet to the first node 114 in response to receiving the first identifiable data packet from the first node 114. The second identifiable data packet may be an echo reply (e.g., a reflection and/or a ping reply) of the first identifiable data packet. For example, content (e.g., a payload) included in the second identifiable data packet may be a copy of content (e.g., a payload) included in the first identifiable data packet. The second packet size of the second identifiable data packet may be equal to the first packet size. Alternatively and/or additionally, the second packet size of the second identifiable data packet may be different than the first packet size. In some examples, the second identifiable data packet may comprise an acknowledgment indication indicating reception (e.g., successful reception) of the first identifiable data packet by the second node 130 from the first node 114.

Generation of the second identifiable data packet (and/or modulation of the second packet size of the second identifiable data packet) may be performed by the second node 130 using one or more of the techniques provided herein with respect to generating the first identifiable data packet and/or modulating the first packet size of the first identifiable data packet.

In some examples, the second packet size of the second identifiable data packet may be a function of the first packet size of the first identifiable data packet. The second node 130 may modulate the second packet size of the second identifiable data packet based upon the first packet size of the first identifiable data packet. For example, the second node 130 may determine a second target packet size (which may be different than or equal to the first packet size) based upon the first packet size, and generate the second identifiable data packet to have the second packet size equal to the second target packet size.

Alternatively and/or additionally, the second node 130 may modulate the second packet size of the second identifiable data packet using a second packet size modulation profile. The second packet size modulation profile may be the same as, or different than, the first packet size modulation profile. The second node 130 may modulate the second packet size based upon the second packet size modulation profile using one or more of the techniques provided herein with respect to the first node 114 modulating the first packet size of the first identifiable data packet based upon the first packet size modulation profile.

The second node 130 may generate the second identifiable data packet by (i) determining a third set of bytes for delivery to the first node 114, (ii) determining the second target packet size (e.g., a target value of the second packet size of the second identifiable data packet) based upon the second packet size modulation profile and/or the first packet size, (iii) appending one or more second additional bytes, to the third set of bytes, to generate a fourth set of bytes for delivery to the first node 114 (e.g., the one or more second additional bytes may be appended to the beginning of the third set of bytes, to the end of the third set of bytes, and/or between bytes of the third set of bytes), (iv) encrypting the fourth set of bytes to generate a second encrypted payload, and/or (v) generating the second identifiable data packet comprising the second encrypted payload. The third set of bytes may comprise at least some of a set of data that is available for transmission to the first node 114. Alternatively and/or additionally, the third set of bytes may comprise a copy of the first set of bytes and/or the second set of bytes provided in the first identifiable data packet.

A quantity of bytes of the one or more second additional bytes appended to the third set of bytes may be determined using one or more of the techniques provided herein with respect to determining the quantity of bytes of the one or more additional bytes (appended to the first set of bytes to generate the second set of bytes). For example, the quantity of bytes of the one or more second additional bytes may be determined such that appending the one or more second additional bytes to the third set of bytes results in the second packet size of the second identifiable data packet being equal to the second target packet size. The second target packet size may correspond to a target size of the second encrypted payload, a target value of the unencrypted data size of the fourth set of bytes, or a target value of a total size (e.g., a total length) of the second identifiable data packet.

In some examples, the size of the second encrypted payload (e.g., a quantity of bytes of the second encrypted payload) is different than an unencrypted data size of the fourth set of bytes (e.g., the unencrypted data size may correspond to the quantity of bytes of the fourth set of bytes before the fourth set of bytes is encrypted to generate the second encrypted payload). FIG. 5 illustrates a table 500 showing example relationships between the unencrypted data size of the fourth set of bytes and the size of the second encrypted payload. The table 500 may correspond to an encrypted data size dictionary associated with an encryption configuration used by the second node 130 to encrypt the fourth set of bytes. In some examples, the encryption configuration used by the second node 130 to encrypt the fourth set of bytes may be the same, or different than, the encryption configuration used by the first node 114 to encrypt the second set of bytes. In the table 500, various values of the unencrypted data size of the fourth set of bytes (that are encrypted to generate the second encrypted payload) are provided in an "Unencrypted Size" column, and various values of the size of the second encrypted payload are provided in an "Encrypted Size" column. Other relationships between the quantity of bytes of the fourth set of bytes and the size of the second encrypted payload are within the scope of the present disclosure.

Figure 6:
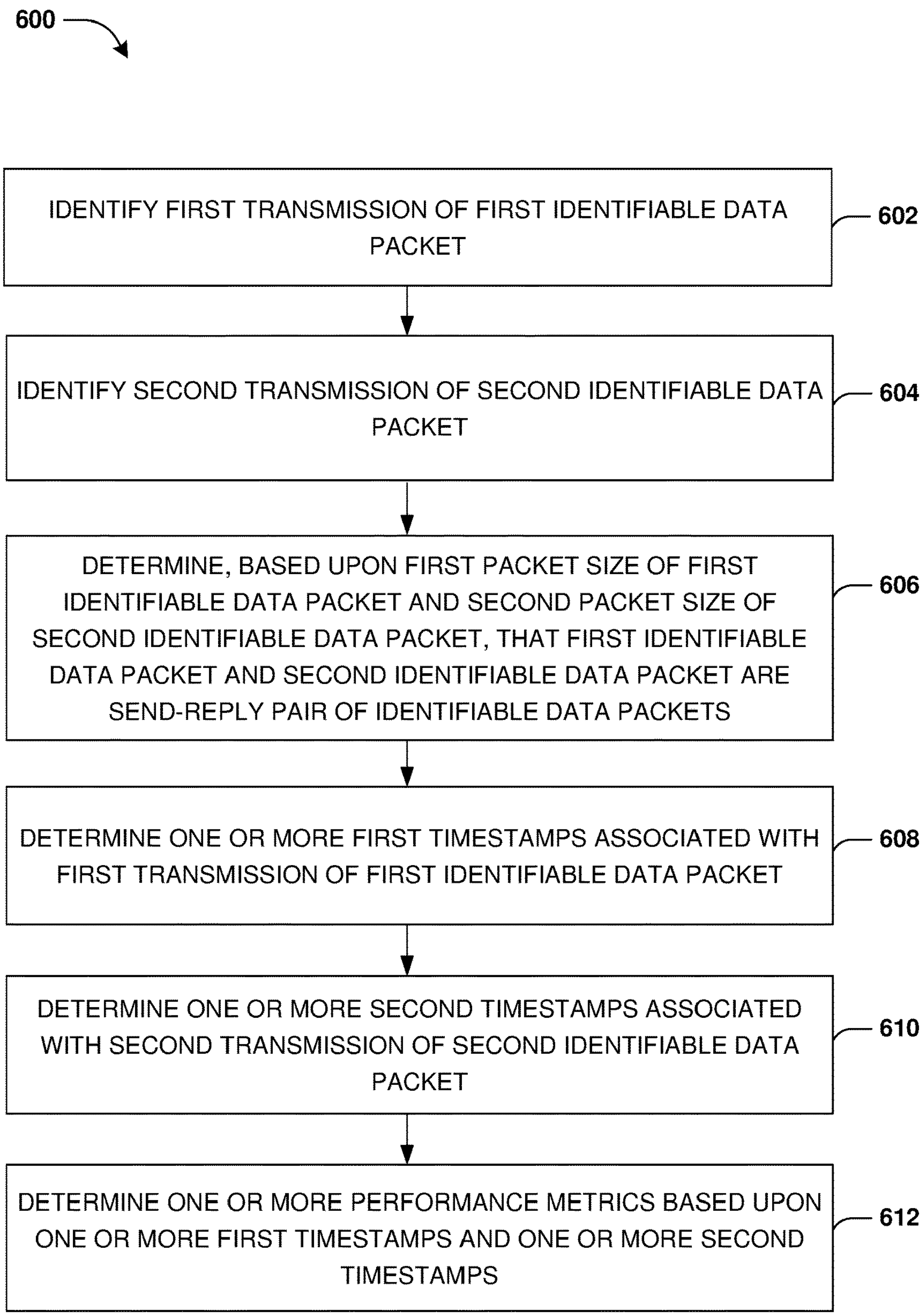
FIG. 6 is a flow chart illustrating an example method for identifying a send-reply pair of data packets and/or determining performance metrics based upon timestamps associated with the send-reply pair of data packets in accordance with an embodiment.

An embodiment of identifying a send-reply pair of data packets and/or determining performance metrics based upon timestamps associated with the send-reply pair of data packets is illustrated by an example method 600 of FIG. 6, and is further described in conjunction with FIG. 1.

At 602, the network management system 100 (shown in FIG. 1) may identify a first transmission, over the network 103, of the first identifiable data packet from the first node 114 to the second node 130. For example, the first transmission of the first identifiable data packet may be identified by the network management system 100 based upon an indication 108, of the first identifiable data packet, received by the network management system 100 (from the first node 114, for example). For example, the indication 108 of the first identifiable data packet may be collected by the network management system 100 using one or more data collection probes 110 of the network management system 100.

At 604, the network management system 100 may identify a second transmission, over the network 103, of the second identifiable data packet from the second node 130 to the first node 114. For example, the second transmission of the second identifiable data packet may be identified by the network management system 100 based upon an indication 112, of the second identifiable data packet, received by the network management system 100 (from the second node 130, for example). For example, the indication 112 of the second identifiable data packet may be collected by the network management system 100 using the one or more data collection probes 110 of the network management system 100.

At 606, the network management system 100 may determine, based upon the first packet size of the first identifiable data packet and the second packet size of the second identifiable data packet, that the first identifiable data packet and the second identifiable data packet are a first send-reply pair of data packets. For example, the network management system 100 associate the first identifiable data packet to the second identifiable data packet based upon the first packet size and the second packet size. The network management system 100 may determine the first packet size based upon a total length field and/or a payload length field of the first identifiable data packet. Alternatively and/or additionally, the network management system 100 may determine the second packet size based upon a total length field and/or a payload length field of the second identifiable data packet.

In an example, the network management system 100 may analyze a send-reply pair identification data structure, based upon the first packet size and the second packet size, to determine that the first identifiable data packet and the second identifiable data packet are the first send-reply pair of data packets. The send-reply pair identification data structure may be indicative of a plurality of pairs of packet sizes, and the network management system 100 may determine that the first identifiable data packet and the second identifiable data packet are the first send-reply pair of data packets based upon a determination that the first packet size and the second packet size match a pair of packet sizes of the plurality of pairs of packet sizes.

FIG. 7 illustrates a table 700 showing an example of the send-reply pair identification data structure. The table 700 in FIG. 7 may relate to an example in which the first packet size, the second packet size and/or the plurality of pairs of packet sizes correspond to encrypted sizes (e.g., sizes of encrypted payloads). In the example shown in FIG. 7, the plurality of pairs of packet sizes may comprise (i) a pair comprising a send packet size of 200 and a reply packet size of 184, (ii) a pair comprising a send packet size of 204 and a reply packet size of 188, (iii) a pair comprising a send packet size of 208 and a reply packet size of 192, etc. Accordingly, the network management system 100 may determine that the first identifiable data packet and the second identifiable data packet are the first send-reply pair of data packets based upon a determination that the first packet size of the first identifiable data packet (e.g., a send data packet) is 200 bytes and the second packet size of the second identifiable data packet (e.g., a reply data packet) is 184 bytes.

FIG. 8 illustrates a table 800 showing an example of the send-reply pair identification data structure. The table 800 in FIG. 8 may relate to an example in which the first packet size, the second packet size and/or the plurality of pairs of packet sizes correspond to unencrypted data sizes (e.g., the unencrypted data size of the second set of bytes, the unencrypted data size of the fourth set of bytes, etc.). In an example, the table 800 indicates a pair comprising a send packet size of 105 and a reply packet size of 95, and the network management system 100 may determine that the first identifiable data packet and the second identifiable data packet are the first send-reply pair of data packets based upon a determination that the first packet size of the first identifiable data packet (e.g., a send data packet) is 105 bytes and the second packet size of the second identifiable data packet (e.g., a reply data packet) is 95 bytes.

In some examples, such as examples in which the second node 130 generates reply data packets having the same size as received data packets, the network management system 100 may determine that the first identifiable data packet and the second identifiable data packet are the first send-reply pair of data packets based upon a determination that the first packet size of the first identifiable data packet equals the second packet size of the second identifiable data packet.

At 608, the network management system 100 may determine a first set of (one or more) timestamps associated with the first transmission of the first identifiable data packet. The first set of timestamps may be indicative of one or more times at which the first identifiable data packet is received, processed and/or transmitted (e.g., forwarded) by nodes along the network path 162. In an example, the first set of timestamps may comprise (i) a first timestamp indicative of a time at which the first identifiable data packet is transmitted by the first node 114, (ii) a second timestamp indicative of a time at which the first identifiable data packet is received (from the first node 114, for example), processed, and/or transmitted (to GW-2, for example) by GW-3 (e.g., eNB, gNB, etc.), (iii) a third timestamp indicative of a time at which the first identifiable data packet is received (from GW-3, for example), processed, and/or transmitted (to GW-1, for example) by GW-2 (e.g., SGW), (iv) a fourth timestamp indicative of a time at which the first identifiable data packet is received (from GW-2, for example), processed, and/or transmitted (to the second node 130, for example) by GW-1 (e.g., PGW), (v) a fifth timestamp indicative of a time at which the first identifiable data packet is received (from GW-1, for example) and/or processed by the second node 130, and/or (vi) one or more other timestamps indicative of one or more other times at which the first identifiable data packet is received, processed and/or transmitted by one or more other nodes (along the network path 162, for example).

At 610, the network management system 100 may determine a second set of (one or more) timestamps associated with the second transmission of the second identifiable data packet. The second set of timestamps may be indicative of one or more times at which the second identifiable data packet is received, processed and/or transmitted (e.g., forwarded) by nodes along the network path 162. In an example, the second set of timestamps may comprise (i) a sixth timestamp indicative of a time at which the second identifiable data packet is transmitted by the second node 130, (ii) a seventh timestamp indicative of a time at which the second identifiable data packet is received (from the second node 130, for example), processed, and/or transmitted (to GW-2, for example) by GW-1 (e.g., PGW), (iii) an eighth timestamp indicative of a time at which the second identifiable data packet is received (from GW-1, for example), processed, and/or transmitted (to GW-3, for example) by GW-2 (e.g., SGW), (iv) a ninth timestamp indicative of a time at which the second identifiable data packet is received (from GW-2, for example), processed, and/or transmitted (to the first node 114, for example) by GW-3 (e.g., eNB, gNB, etc.), (v) a tenth timestamp indicative of a time at which the second identifiable data packet is received (from GW-3, for example) and/or processed by the first node 114, and/or (vi) one or more other timestamps indicative of one or more other times at which the second identifiable data packet is received, processed and/or transmitted by one or more other nodes (along the network path 162, for example).

In some examples, the first set of timestamps (associated with the first transmission of the first identifiable data packet) and the second set of timestamps (associated with the second transmission of the second identifiable data packet) are determined using the one or more data collection probes 110 of the network management system 100. The one or more data collection probes 110 may be connected to one or more nodes of the network 103, such as the first node 114, the second node 130, GW-1, GW-2, GW-3 and/or one or more other nodes. In an example, the one or more data collection probes 110 may perform Packet Capture (PCAP) data collection (to intercept and/or collect data packets, for example) at various points along the network path 162. In some examples, the one or more data collection probes 110 may use one or more second interfaces to communicate with the one or more nodes and/or to perform PCAP data collection. The one or more second interfaces may comprise (i) one, some and/or all of the one or more first interfaces, (ii) User Plane Function (UPF) (e.g., 5G UPF), and/or (iii) one or more other interfaces.

For example, the one or more data collection probes 110 may be connected to nodes (e.g., the first node 114, the second node 130, GW-1, GW-2, GW-3 and/or one or more other nodes) of the network 103 via connections 166, 156, 154, 152, and/or 148. Using the connections 166, 156, 154, 152, and/or 148, the one or more data collection probes 110 may collect data (by performing PCAP data collection, for example) from the nodes. The network management system 100 may determine the first set of timestamps and/or the second set of timestamps based upon the collected data.

A data collection manager 102 of a data center 106 of the network management system 100 may store at least some of the collected data in a data store 104 of the data center 106. The data collection manager 102 may filter the collected data to store a subset of the collected data relating to relevant test sessions (e.g., the test sessions may be performed for the use of determining performance metrics associated with the network 103 and/or managing the network 103). In some examples, the data collection manager 102 may filter the collected data based upon IP addresses and/or test times associated with the IP addresses. In an example, data associated with the first identifiable data packet and/or the second identifiable data packet may be included in the subset of the collected data (and/or stored in the data store 104) based upon a determination that (i) the data is indicative of a first IP address of the first node 114 and/or a second IP address of the second node 130, and/or (ii) the data is indicative of one or more timestamps (associated with the first transmission of the first identifiable data packet and/or the second transmission of the second identifiable data packet, for example) within a test time period scheduled for testing network performance associated with the first node 114 and/or the second node 130. For example, the first identifiable data packet, the second identifiable data packet, and/or other identifiable data packets may be sent by the first node 114 and/or the second node 130 as part of a network performance test to determine performance metrics associated with transmissions between the first node 114 and the second node 130. The test time period may be scheduled for the network performance test. The network performance test may be performed to determine performance metrics associated with the network and/or the first application (hosted on the second node 130, for example).

At 612, the network management system 100 may determine a set of (one or more) performance metrics, associated with the first send-reply pair of data packets and/or the network 103, based upon the first set of timestamps and/or the second set of timestamps. For example, the set of performance metrics may comprise (i) a latency metric, (ii) a jitter metric, (iii) a packet loss metric, (iv) a packet retransmission metric, (v) an OOO packet transmission metric, (vi) a bandwidth metric, and/or (vii) one or more other performance metrics. For example, a performance metric of the set of performance metrics may be determined by comparing timestamps (of the first set of timestamps and/or the second set of timestamps) with each other (such as to determine a duration of time it takes for the first identifiable data packet and/or the second identifiable data packet to be propagated along at least a portion of the network path 162).

In some examples, the set of performance metrics may comprise one or more end-to-end performance metrics associated with end-to-end transmission of the first identifiable data packet and/or the second identifiable data packet. For example, the one or more end-to-end performance metrics may be determined based upon timestamps associated with the first node 114 and/or the second node 130, such as the first timestamp (e.g., the time at which the first identifiable data packet is transmitted by the first node 114), the fifth timestamp (e.g., the time at which the first identifiable data packet is received and/or processed by the second node 130), the sixth timestamp (e.g., the time at which the second identifiable data packet is transmitted by the second node 130), and/or the tenth timestamp (e.g., the time at which the second identifiable data packet is received and/or processed by the first node 114). For example, the one or more end-to-end performance metrics may comprise (and/or be based upon) (i) a difference between the first timestamp and the fifth timestamp (e.g., a latency corresponding to a time it takes for the first identifiable data packet to reach the second node 130 from the first node 114), (ii) a difference between the sixth timestamp and the tenth timestamp (e.g., a latency corresponding to a time it takes for the second identifiable data packet to reach the first node 114 from the second node 130), and/or (iii) a difference between the first timestamp and the tenth timestamp (e.g., a latency corresponding to a time it takes for the first node 114 to receive a reply from the second node 130 after transmitting the first identifiable data packet).

In some examples, the set of performance metrics may comprise one or more sets of network segment performance metrics associated with one or more network segments (of the network 103). For example, the one or more sets of network segment performance metrics may comprise (i) a first set of (one or more) network segment performance metrics associated with a first network segment (of the network 103), (ii) a second set of (one or more) network segment performance metrics associated with a second network segment 136 (shown in FIG. 1) between GW-1 and the second node 130, (iii) a third set of (one or more) third network segment performance metrics associated with a third network segment 134 between GW-2 and the second node 130, and/or (iv) a fourth set of (one or more) network segment performance metrics associated with a fourth network segment 138 between GW-3 and the second node 130. For example, the first network segment may correspond to a segment, of the network path 162, between a third node and a fourth node. The first set of network segment performance metrics may be determined based upon one or more timestamps associated with the third node (e.g., one or more times at which the first identifiable data packet and/or the second identifiable data packet are received, processed and/or transmitted by the third node) and/or one or more timestamps associated with the fourth node (e.g., one or more times at which the first identifiable data packet and/or the second identifiable data packet are received, processed and/or transmitted by the fourth node).

In an example, the third node is between the first node 114 and the second node 130 (e.g., the fourth node is the second node 130). Accordingly, the first network segment corresponds to a segment, of the network 103, between the third node and the second node 130. The first set of network segment performance metrics comprise (and/or be based upon) a difference between (i) a timestamp, of the first set of timestamps (associated with the first identifiable data packet), corresponding to a time at which the first identifiable data packet is received, processed and/or transmitted by the third node, and/or (ii) a timestamp, of the second set of timestamps (associated with the second identifiable data packet), corresponding to a time at which the second identifiable data packet is received, processed and/or transmitted by the third node). For example, the difference may correspond to a latency corresponding to a time it takes for the third node to receive a reply (e.g., the second identifiable data packet) from the second node 130 after transmitting (e.g., forwarding) the first identifiable data packet.

In some examples, the first set of network segment performance metrics may comprise one or more one-way performance metrics associated with the first transmission of the first identifiable data packet or the second transmission of the second identifiable data packet. For example, the one or more one-way performance metrics may comprise a first one-way performance metric associated with the first transmission of the first identifiable data packet. The first one-way performance metric may be based upon a difference between (i) a timestamp, of the first set of timestamps (associated with the first identifiable data packet), corresponding to a time at which the first identifiable data packet is received, processed and/or transmitted by the third node, and/or (ii) a timestamp, of the first set of timestamps (associated with the first identifiable data packet), corresponding to a time at which the first identifiable data packet is received, processed and/or transmitted by the fourth node). For example, the difference may correspond to a latency corresponding to a time it takes for the first identifiable data packet to propagate from the third node to the fourth node. Alternatively and/or additionally, the one or more one-way performance metrics may comprise a second one-way performance metric associated with the second transmission of the second identifiable data packet, which may be determined (based upon timestamps of the second set of timestamps, for example) using one or more of the techniques provided with respect to determining the first one-way performance metric. The second one-way performance metric may be indicative of a latency corresponding to a time it takes for the second identifiable data packet to propagate from the fourth node to the third node. In some examples, clocks of nodes (e.g., the third node and the fourth node) of the network 103 may be synchronized to increase an accuracy of differences between timestamps of different nodes of the network 103. For example, the nodes of the network 103 may use a master clock.

In some examples, the second set of network segment performance metrics, the third set of network segment performance metrics and/or the fourth set of network segment performance metrics may be determined using one or more of the techniques provided herein with respect to determining the first set of network segment performance metrics. In some examples, at least some of the set of performance metrics may be determined based upon timestamps (comprising the first set of timestamps and the second set of timestamps) associated with a plurality of send-reply pairs of data packets comprising the first send-reply pair of data packets. For example, a plurality of performance metrics may be determined using timestamps associated with the plurality of send-reply pairs of data packets, and the plurality of performance metrics may be combined (e.g., averaged) and/or analyzed to determine a performance metric of the set of performance metrics (e.g., a plurality of latency metrics associated with a network segment may be averaged to determine an average latency of the network segment, which may be included in the set of performance metrics). The plurality of send-reply pairs of data packets may comprise transmissions of data packets between the first node 114 and the second node 130 during the test time period (e.g., the data packets may be transmitted to perform the network performance test to determine the set of performance metrics).

FIG. 9 illustrates a table 900 indicative of data associated with transmissions of data packets of the plurality of send-reply pairs of data packets. The data may be collected using the one or more data collection probes 110 of the network management system 100. The data may be collected during the test time period associated with the network performance test. The data may be used to determine the set of performance metrics. A "Tx Rx #" column of the table 900 provides identifiers (e.g., Tx1, Tx2, Tx3, etc.) of send data packets (e.g., transmitter (Tx) data packets transmitted by the first node 114) and identifiers (e.g., Rx1, Rx2, Rx3, etc.) of reply data packets (e.g., receive (Rx) data packets transmitted by the second node 130 in response to the send data packets). A "Number" column of the table 900 indicates an order in which the transmissions of the data packets are performed. A "Time" column of the table 900 provides timestamps associated with the transmissions of the data packets. The timestamps may be associated with a node of the network 103, such as the first node 114, the second node 130, GW-1, GW-2, GW-3, or other node. For example, the timestamps may correspond to times at which the data packets of the plurality of send-reply pairs of data packets are received, processed and/or transmitted by the node. A "Source" column of the table 900 provides indications (e.g., IP addresses) of sources of the transmissions of the data packets. A "Destination" column of the table 900 provides indications (e.g., IP addresses) of destinations of the transmissions of the data packets. In an example, an IP address of the first node 114 may be "145.182.4.21" and/or an IP address of the second node 130 may be "182.262.1.65". A "Protocol" column of the table 900 provides indications of a protocol (e.g., Datagram Transport Layer Security (DTLS), such as DTLS Version 1.2) used to perform the transmissions of the data packets. An "Unencrypted Payload Data Size" column of the table 900 provides indications of unencrypted data sizes (e.g., the unencrypted data size of the second set of bytes, the unencrypted data size of the fourth set of bytes, etc.) of data included in payloads of the data packets. An "Encrypted Payload Size" column of the table 900 provides indications of encrypted sizes (e.g., sizes of encrypted payloads) of encrypted payloads of the data packets. An "Info" column of the table 900 provides indications of types of information carried by the data packets (e.g., "Application Data" may indicate that the data packets carry information associated with the first application).

The plurality of send-reply pairs of data packets may comprise Pairs 1-6, where Pair 1 may correspond to the first send-reply pair of data packets. The first transmission of the first identifiable data packet may be identified as "Tx1" and the second transmission of the second identifiable data packet may be identified as "Rx1".

The plurality of send-reply pairs of data packets may be identified based upon packet sizes (e.g., unencrypted data sizes in the "Unencrypted Payload Data Size" column and/or encrypted sizes in the "Encrypted Payload Size" column"). For example, the plurality of send-reply pairs of data packets may be identified using the send-reply pair identification data structure. In an example in which the packet sizes used to identify the plurality of send-reply pairs of data packets correspond to encrypted payload sizes (such as discussed with respect to the table 700 of FIG. 7), (i) Pair 1 (e.g., the first send-reply pair of data packets) may be identified by matching a "send" size of 200 bytes to a "reply" size of 184 bytes, (ii) Pair 2 may be identified by matching a "send" size of 204 bytes to a "reply" size of 188 bytes, etc.

In the example shown in FIG. 9, the first node 114 may modulate packet sizes of data packet transmissions Tx1, Tx2, Tx3, Tx4, Tx5, and Tx6 according to the first packet size modulation profile. In a first example, the first packet size modulation profile may comprise the sequence of packet sizes (e.g., encrypted payload sizes) comprising {200 bytes, 204 bytes, 208 bytes, 212 bytes, 212 bytes, 216 bytes, 220 bytes}. In a second example, the first packet size modulation profile may comprise the increment function with an initial value of 200 bytes, and an increment value of 4 bytes (e.g., each subsequent data packet has an encrypted payload size increased by 4 bytes).

In some examples, the first node 114 may perform a modulation reset in response to a modulation reset condition being met. The modulation reset may comprise resetting a modulation key. The modulation key may be used by the first node 114 to modulate packet sizes based upon the first packet size modulation profile. In an example, the first node 114 maintains the modulation key to be equal to a target packet size of a next transmission of a data packet to the second node 130. For example, prior to performing the first transmission "Tx1" of the first identifiable data packet with the first packet size, the modulation key may be set to 200 bytes (e.g., the initial value of the increment function and/or a beginning value of the sequence of packet sizes). The first identifiable data packet may be generated to have the first packet size of 200 bytes based upon the modulation key. In response to (e.g., upon) performing the first transmission "Tx1" of the first identifiable data packet with the first packet size of 200 bytes, the first node 114 may set the modulation key to 204 bytes (based upon the increment function and/or based upon a subsequent packet size in the sequence of packet sizes). Resetting the modulation key may comprise setting the modulation key to the initial value of the function (e.g., 200 bytes) and/or to a beginning packet size of the sequence of packet sizes (e.g., 200 bytes).

The modulation reset condition may be determined to be met based upon transmission of a data packet (to the second node 130 and/or as part of the network performance test) with a packet size corresponding to (i) a last packet size of the sequence of packet sizes, (ii) a maximum packet size of the increment function, and/or (iii) a minimum packet size of the decrement function. In an example in which the last packet size of the sequence of packet sizes is 220 bytes, the modulation reset condition may be determined to be met based upon the data packet transmission Tx6 with the packet size of 220 bytes. Accordingly, the first node 114 may reset the modulation key (e.g., change the modulation key from 220 bytes to 200 bytes). After resetting the modulation key, the first node 114 may modulate a packet size of a subsequent data packet transmission (e.g., a data packet transmission, addressed to the second node 130, subsequent to the data packet transmission Tx6) to be 200 bytes.

Alternatively and/or additionally, the modulation reset condition may be determined to be met based upon reception of a reply data packet, from the second node 130, that is in response to a send data packet (transmitted by the first node 114) having a packet size equal to a beginning packet size of the sequence of packet sizes and/or an initial value of the function.

Figure 10:
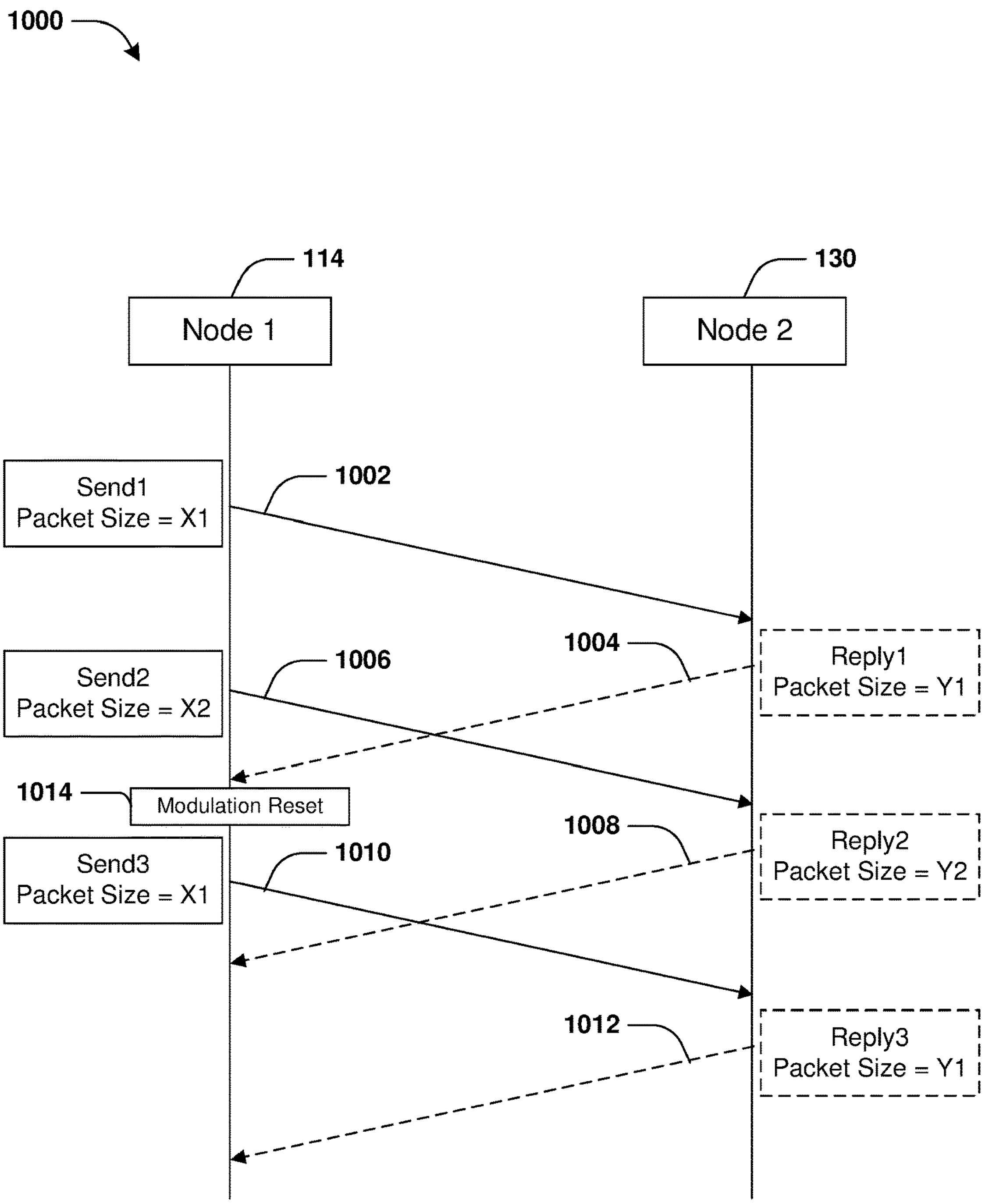
FIG. 10 is a diagram illustrating an example scenario in which a first node performs a modulation reset in accordance with an embodiment.

FIG. 10 illustrates an example scenario 1000 in which the first node 114 (e.g., a client UE) performs a modulation reset 1014. The data packet transmissions shown in FIG. 10 may be performed during the test time period and/or as part of the network performance test. The first node 114 may perform a transmission 1002 of a send data packet "Send1" with a modulated packet size equal to X1. The first node 114 may generate Send1 with the modulated packet size of X1 based upon the modulation key being set to X1 prior to the transmission 1002. X1 may correspond to a beginning packet size of the sequence of packet sizes and/or an initial value of the function. In response to the transmission 1002, the first node 114 may set the modulation key to a value X2. In an example in which the first packet size modulation profile comprises the sequence of packet sizes, X2 may correspond to a subsequent packet size (subsequent to the beginning packet size) of the sequence of packet sizes. In an example, in which the first packet size modulation profile comprises an increment function, X2 may correspond to a sum of the initial value (equal to X1) and the increment value (e.g., if the initial value is 200 bytes and the increment value is 4 bytes, X2 may be equal to 204 bytes). After the transmission 1002, the first node 114 may perform a transmission 1006 (subsequent to the transmission 1002) of a send data packet "Send2" with a modulated packet size equal to X2 (based upon the modulation key being set to X2).

In response to Send1, the second node 130 may perform a transmission 1004 of a reply data packet "Reply1". A packet size Y1 of Reply1 may be based upon (e.g., equal to and/or a function of) the packet size X1 of Send1. Alternatively and/or additionally, the packet size Y1 of Reply1 may be based upon the second packet size modulation profile. Send1 and Reply1 may be identifiable as a send-reply pair of data packets based upon the packet size X1 of Send1 and the packet size Y1 of Reply1. In response to Send2, the second node 130 may perform a transmission 1008 of a reply data packet "Reply2". A packet size Y2 of Reply1 may be based upon (e.g., equal to and/or a function of) the packet size X2 of Send2. Alternatively and/or additionally, the packet size Y2 of Reply2 may be based upon the second packet size modulation profile. Send2 and Reply2 may be identifiable as a send-reply pair of data packets based upon the packet size X2 of Send2 and the packet size Y2 of Reply2.

The first node 114 may perform the modulation reset 1014 in response to receiving Reply1. The first node 114 may perform the modulation reset 1014 based upon a determination that Reply1 is in response to Send1 that has the packet size X1 equal to the beginning packet size of the sequence of packet sizes and/or the initial value of the function. The modulation reset 1014 may comprise resetting the modulation key, such as by setting the modulation key to X1. Accordingly, after performing the modulation reset 1014, the first node 114 may perform a transmission 1010 of a send data packet "Send3" with a modulated packet size equal to X1. In response to Send3, the second node 130 may perform a transmission 1012 of a reply data packet "Reply3" with a packet size equal to Y1.

FIG. 11 illustrates a table 1100 indicative of data associated with transmissions of data packets of the plurality of send-reply pairs of data packets. The data may be collected using the one or more data collection probes 110 of the network management system 100. The data may be collected during the test time period associated with the network performance test. The data may be used to determine the set of performance metrics. A "Tx Rx #" column, a "Number" column, a "Time" column, a "Source" column, a "Destination" column, a "Protocol" column, an "Encrypted Payload Size", and/or an "Info" column of the table 1100 are described with respect to corresponding columns of the table 900 in FIG. 9. A "Packet Length" column of the table 1100 provides an indication of a total length (e.g., a total size) of a data packet. In the example shown in FIG. 11, the plurality of send-reply pairs of data packets comprise Pairs 1-11. Prior to transmissions of data packets of Pairs 1-11, the first node 114 may perform a transmission (identified by Number 16 in the "Number" column) of a data packet comprising a binding indication (e.g., the transmission may be performed using Session Traversal Utilities for Network Address Translator (STUN) protocol and/or other protocol). There is a size increase from Pair 10 to Pair 11. For example, a send packet "Tx10" of Pair 10 has an encrypted payload size of 200 bytes and/or a total packet length of 263 bytes, whereas a send packet "Tx11" of Pair 11 has an encrypted payload size of 204 bytes and/or a total packet length of 267 bytes. Alternatively and/or additionally, a reply packet "Rx10" of Pair 10 has an encrypted payload size of 184 bytes and/or a total packet length of 247 bytes, whereas a reply packet "Rx11" of Pair 11 has an encrypted payload size of 188 bytes and/or a total packet length of 251 bytes.

In some examples, the network management system 100 (shown in FIG. 1) may generate a network performance report based upon the set of performance metrics. The network management system 100 may transmit the network performance report to a network administration device. Alternatively and/or additionally, the network management system 100 may display the network performance report via a graphical user interface. The network performance report may be indicative of the set of performance metrics. Alternatively and/or additionally, the network management system 100 may transmit the network performance report to an application administration device associated with the first application. For example, the application administration device may be associated with an entity corresponding to a manager, owner, employee, etc. associated with the first application. In some examples, the network management system 100 may compare the set of performance metrics with expected performance metrics indicated by an agreement (e.g., a service-level agreement (SLA)) associated with the entity and/or the first application. The network management system 100 may generate the network performance report based upon the comparison. In an example, the agreement may be indicative of a latency expectation specifying that network traffic between users of the first application (e.g., the first node 114) and a server that hosts the first application (e.g., the second node 130) should have a latency that is at most an expected maximum latency. The network performance report may indicate whether the latency expectation indicated by the agreement is satisfied. For example, if the set of performance metrics indicate a latency that exceeds the expected maximum latency, the network performance report may indicate that the latency expectation is not satisfied. Alternatively and/or additionally, if the set of performance metrics indicate a latency that is lower than or equal to the expected maximum latency, the network performance report may indicate that the latency expectation is satisfied.

In some examples, the network management system 100 may modify one or more parameters of one or more components of the network 103 based upon the set of performance metrics. For example, the one or more parameters may comprise (i) one or more Quality of Service (QoS) parameters associated with the first node 114, the second node 130 and/or one or more other nodes of the network 103, (ii) one or more charging parameters associated with the first node 114, the second node 130 and/or one or more other nodes of the network 103, (iii) one or more network slicing parameters associated with the first node 114, the second node 130 and/or one or more other nodes of the network 103, and/or (iv) one or more other parameters associated with the first node 114, the second node 130 and/or one or more other nodes of the network 103.

In some examples, a performance metric of the set of performance metrics may be compared with a performance metric threshold. In response to determining that the performance metric does not meet the performance metric threshold, the network management system 100 may perform one or more actions to improve network performance associated with the first node 114, the second node 130 and/or the first application. In an example, the one or more actions may be performed in response to (i) determining that a latency metric of the set of performance metrics exceeds a latency threshold, (ii) determining that a jitter metric of the set of performance metrics exceeds a jitter threshold, (iii) determining that a transmission speed metric of the set of performance metrics is lower than a transmission speed metric threshold, and/or (iv) a determination that a packet loss metric of the set of performance metrics exceeds a packet loss threshold (e.g., the one or more actions may be performed to at least one of reduce latency, reduce jitter, increase transmission speed, reduce packet loss, etc. associated the network 103 and/or the first application).

In some examples, the one or more actions may comprise (i) modifying network resources, of the network 103, allocated for the first node 114 and/or the second node 130 (e.g., allocating a new set of network resources for use by the first node 114 and/or the second node 130), (ii) switching a network slice assigned to the first node 114 and/or the second node 130 (e.g., switching a network slice assigned to the first node 114 and/or the second node 130 from a first network slice to a second network slice), (iii) modifying one or more QoS parameters associated with the first node 114 and/or the second node 130 (e.g., increasing a QoS level assigned to the first node 114 and/or the second node 130), (iv) modifying a priority of traffic of the first node 114 and/or the second node 130 (e.g., increasing a priority of traffic of the first node 114 and/or the second node 130 to prioritize the traffic over other traffic in the network), and/or (v) one or more other actions. Performing the one or more actions may improve network performance of the first node 114, the second node 130 and/or the first application.

In some examples, the network management system 100 may use Self-Organizing Network (SON) functionality and/or Network Data Analytics Function (NWDAF) to determine the set of performance metrics and/or perform the one or more actions. Using the set of performance metrics to modify the one or more parameters and/or perform the one or more actions may improve network performance of the network 103 (e.g., reduced latency, increased transmission speed, etc.) and/or may improve performance of the first application (e.g., at least one of gaming content, virtual reality content, etc. of the first application may be provided to the first node 114 more seamlessly and/or with less delay). In this way, the network management system 100 implements a closed-loop process allowing usage of feedback (e.g., the set of performance metrics) to tailor and/or continuously and/or periodically update network parameters used to facilitate communication between the first node 114 and the second node 130, thereby improving performance of the first node 114, the second node 130 and/or the first application. Closed-loop control may reduce errors and produce more efficient operation of a computer system which implements the network management system 100, the first node 114 and/or the second node 130. The reduction of errors and/or the efficient operation of the computer system may improve operational stability and/or predictability of operation. Accordingly, using processing circuitry to implement closed loop control described herein may improve operation of underlying hardware of the computer system.

In some examples, the network management system 100 may perform one or more network segment-based actions based upon network segment performance metrics of the set of performance metrics. For example, the one or more network segment-based actions may comprise identifying a malfunctioning network segment based upon the network segment performance metrics. For example, the malfunctioning network segment may be identified based upon a determination that a network segment performance metric associated with the network segment does not meet a threshold performance metric. In some examples, in response to identifying the malfunctioning network segment, the network management system 100 may (i) deploy one or more resources to one or more components (e.g., malfunctioning components) of the malfunctioning network segment, (ii) reconfigure, repair and/or replace one or more components (e.g., malfunctioning components) of the malfunctioning network segment, (iii) perform a software update for one or more components (e.g., malfunctioning components) of the malfunctioning network segment, and/or (iv) transmit information, associated with the malfunctioning network segment, to a network maintenance device associated with a network maintenance agent (e.g., a person, a robot, etc. tasked with repairing and/or performing maintenance for network components of the malfunctioning network segment). The network maintenance agent may use the information to repair, reconfigure and/or replace one or more malfunctioning components of the malfunctioning network segment.

Figure 12:
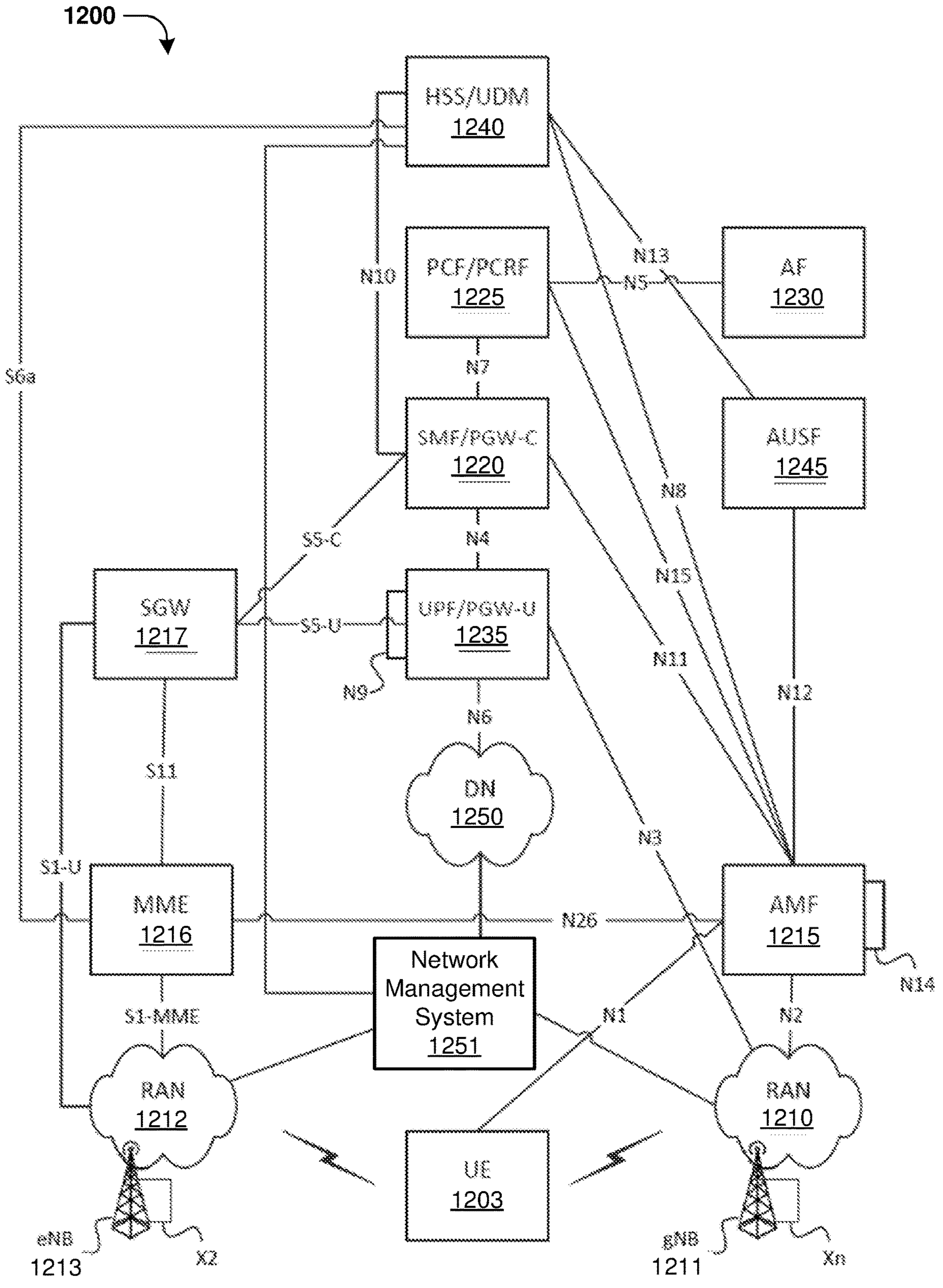
FIG. 12 is an illustration of an example environment in which at least a portion of the techniques presented herein may be utilized and/or implemented.

FIG. 12 illustrates an example environment 1200, in which one or more embodiments may be implemented. In some embodiments, environment 1200 may correspond to a Fifth Generation ("5G") network, and/or may include elements of a 5G network. In some embodiments, the private network 104 and/or a private network site of the private network 104 (e.g., each private network site of one, some and/or all of the plurality of private network sites of the private network 104) may be implemented using techniques, configurations and/or components shown in and/or described with respect to FIG. 12. In some embodiments, environment 1200 may correspond to a 5G Non-Standalone ("NSA") architecture, in which a 5G radio access technology ("RAT") may be used in conjunction with one or more other RATs (e.g., a Long-Term Evolution ("LTE") RAT), and/or in which elements of a 5G core network may be implemented by, may be communicatively coupled with, and/or may include elements of another type of core network (e.g., an evolved packet core ("EPC")). As shown, environment 1200 may include UE 1203, RAN 1210 (which may include one or more Next Generation Node Bs ("gNBs") 1211), RAN 1212 (which may include one or more one or more evolved Node Bs ("eNBs") 1213), and various network functions such as Access and Mobility Management Function ("AMF") 1215, Mobility Management Entity ("MME") 1216, Serving Gateway ("SGW") 1217, Session Management Function ("SMF")/Packet Data Network ("PDN") Gateway ("PGW")-Control plane function ("PGW-C") 1220, Policy Control Function ("PCF")/Policy Charging and Rules Function ("PCRF") 1225, Application Function ("AF") 1230, User Plane Function ("UPF")/PGW-User plane function ("PGW-U") 1235, Home Subscriber Server ("HSS")/Unified Data Management ("UDM") 1240, and Authentication Server Function ("AUSF") 1245. Environment 1200 may also include one or more networks, such as Data Network ("DN") 1250. Environment 1200 may include one or more additional devices or systems communicatively coupled to one or more networks (e.g., DN 1250), such as network management system 1251.

The example shown in FIG. 12 illustrates one instance of each network component or function (e.g., one instance of SMF/PGW-C 1220, PCF/PCRF 1225, UPF/PGW-U 1235, HSS/UDM 1240, and/or 1245). In practice, environment 1200 may include multiple instances of such components or functions. For example, in some embodiments, environment 1200 may include multiple "slices" of a core network, where each slice includes a discrete set of network functions (e.g., one slice may include a first instance of SMF/PGW-C 1220, PCF/PCRF 1225, UPF/PGW-U 1235, HSS/UDM 1240, and/or 1245, while another slice may include a second instance of SMF/PGW-C 1220, PCF/PCRF 1225, UPF/PGW-U 1235, HSS/UDM 1240, and/or 1245). The different slices may provide differentiated levels of service, such as service in accordance with different Quality of Service ("QoS") parameters.

The quantity of devices and/or networks, illustrated in FIG. 12, is provided for explanatory purposes only. In practice, environment 1200 may include additional devices and/or networks, fewer devices and/or networks, different devices and/or networks, or differently arranged devices and/or networks than illustrated in FIG. 12. For example, while not shown, environment 1200 may include devices that facilitate or enable communication between various components shown in environment 1200, such as routers, modems, gateways, switches, hubs, etc. Alternatively and/or additionally, one or more of the devices of environment 1200 may perform one or more network functions described as being performed by another one or more of the devices of environment 1200. Devices of environment 1200 may interconnect with each other and/or other devices via wired connections, wireless connections, or a combination of wired and wireless connections. In some implementations, one or more devices of environment 1200 may be physically integrated in, and/or may be physically attached to, one or more other devices of environment 1200.

UE 1203 may include a computation and communication device, such as a wireless mobile communication device that is capable of communicating with RAN 1210, RAN 1212, and/or DN 1250. UE 1203 may be, or may include, a radiotelephone, a personal communications system ("PCS") terminal (e.g., a device that combines a cellular radiotelephone with data processing and data communications capabilities), a personal digital assistant ("PDA") (e.g., a device that may include a radiotelephone, a pager, Internet/intranet access, etc.), a smart phone, a laptop computer, a tablet computer, a camera, a personal gaming system, an IoT device (e.g., a sensor, a smart home appliance, or the like), a wearable device, an Internet of Things ("IoT") device, a Mobile-to-Mobile ("M2M") device, or another type of mobile computation and communication device. UE 1203 may send traffic to and/or receive traffic (e.g., user plane traffic) from DN 1250 via RAN 1210, RAN 1212, and/or UPF/PGW-U 1235.

RAN 1210 may be, or may include, a 5G RAN that includes one or more base stations (e.g., one or more gNBs 1211), via which UE 1203 may communicate with one or more other elements of environment 1200. UE 1203 may communicate with RAN 1210 via an air interface (e.g., as provided by gNB 1211). For instance, RAN 1210 may receive traffic (e.g., voice call traffic, data traffic, messaging traffic, signaling traffic, etc.) from UE 1203 via the air interface, and may communicate the traffic to UPF/PGW-U 1235, and/or one or more other devices or networks. Similarly, RAN 1210 may receive traffic intended for UE 1203 (e.g., from UPF/PGW-U 1235, AMF 1215, and/or one or more other devices or networks) and may communicate the traffic to UE 1203 via the air interface.

RAN 1212 may be, or may include, a LTE RAN that includes one or more base stations (e.g., one or more eNBs 1213), via which UE 1203 may communicate with one or more other elements of environment 1200. UE 1203 may communicate with RAN 1212 via an air interface (e.g., as provided by eNB 1213). For instance, RAN 1210 may receive traffic (e.g., voice call traffic, data traffic, messaging traffic, signaling traffic, etc.) from UE 1203 via the air interface, and may communicate the traffic to UPF/PGW-U 1235, and/or one or more other devices or networks. Similarly, RAN 1210 may receive traffic intended for UE 1203 (e.g., from UPF/PGW-U 1235, SGW 1217, and/or one or more other devices or networks) and may communicate the traffic to UE 1203 via the air interface.

AMF 1215 may include one or more devices, systems, Virtualized Network Functions ("VNFs"), etc., that perform operations to register UE 1203 with the 5G network, to establish bearer channels associated with a session with UE 1203, to hand off UE 1203 from the 5G network to another network, to hand off UE 1203 from the other network to the 5G network, manage mobility of UE 1203 between RANs 1210 and/or gNBs 1211, and/or to perform other operations. In some embodiments, the 5G network may include multiple AMFs 1215, which communicate with each other via the N14 interface (denoted in FIG. 12 by the line marked "N14" originating and terminating at AMF 1215).

MME 1216 may include one or more devices, systems, VNFs, etc., that perform operations to register UE 1203 with the EPC, to establish bearer channels associated with a session with UE 1203, to hand off UE 1203 from the EPC to another network, to hand off UE 1203 from another network to the EPC, manage mobility of UE 1203 between RANs 1212 and/or eNBs 1213, and/or to perform other operations.

SGW 1217 may include one or more devices, systems, VNFs, etc., that aggregate traffic received from one or more eNBs 1213 and send the aggregated traffic to an external network or device via UPF/PGW-U 1235. Additionally, SGW 1217 may aggregate traffic received from one or more UPF/PGW-Us 1235 and may send the aggregated traffic to one or more eNBs 1213. SGW 1217 may operate as an anchor for the user plane during inter-eNB handovers and as an anchor for mobility between different telecommunication networks or RANs (e.g., RANs 1210 and 1212).

SMF/PGW-C 1220 may include one or more devices, systems, VNFs, etc., that gather, process, store, and/or provide information in a manner described herein. SMF/PGW-C 1220 may, for example, facilitate in the establishment of communication sessions on behalf of UE 1203. In some embodiments, the establishment of communications sessions may be performed in accordance with one or more policies provided by PCF/PCRF 1225.

PCF/PCRF 1225 may include one or more devices, systems, VNFs, etc., that aggregate information to and from the 5G network and/or other sources. PCF/PCRF 1225 may receive information regarding policies and/or subscriptions from one or more sources, such as subscriber databases and/or from one or more users (such as, for example, an administrator associated with PCF/PCRF 1225).

AF 1230 may include one or more devices, systems, VNFs, etc., that receive, store, and/or provide information that may be used in determining parameters (e.g., quality of service parameters, charging parameters, or the like) for certain applications.

UPF/PGW-U 1235 may include one or more devices, systems, VNFs, etc., that receive, store, and/or provide data (e.g., user plane data). For example, UPF/PGW-U 1235 may receive user plane data (e.g., voice call traffic, data traffic, etc.), destined for UE 1203, from DN 1250, and may forward the user plane data toward UE 1203 (e.g., via RAN 1210, SMF/PGW-C 1220, and/or one or more other devices). In some embodiments, multiple UPFs 1235 may be deployed (e.g., in different geographical locations), and the delivery of content to UE 1203 may be coordinated via the N9 interface (e.g., as denoted in FIG. 12 by the line marked "N9" originating and terminating at UPF/PGW-U 1235). Similarly, UPF/PGW-U 1235 may receive traffic from UE 1203 (e.g., via RAN 1210, SMF/PGW-C 1220, and/or one or more other devices), and may forward the traffic toward DN 1250. In some embodiments, UPF/PGW-U 1235 may communicate (e.g., via the N4 interface) with SMF/PGW-C 1220, regarding user plane data processed by UPF/PGW-U 1235.

HSS/UDM 1240 and AUSF 1245 may include one or more devices, systems, VNFs, etc., that manage, update, and/or store, in one or more memory devices associated with AUSF 1245 and/or HSS/UDM 1240, profile information associated with a subscriber. AUSF 1245 and/or HSS/UDM 1240 may perform authentication, authorization, and/or accounting operations associated with the subscriber and/or a communication session with UE 1203.

DN 1250 may include one or more wired and/or wireless networks. For example, DN 1250 may include an Internet Protocol ("IP")-based PDN, a wide area network ("WAN") such as the Internet, a private enterprise network, and/or one or more other networks. UE 1203 may communicate, through DN 1250, with data servers, other UEs UE 1203, and/or to other servers or applications that are coupled to DN 1250. DN 1250 may be connected to one or more other networks, such as a public switched telephone network ("PSTN"), a public land mobile network ("PLMN"), and/or another network. DN 1250 may be connected to one or more devices, such as content providers, applications, web servers, and/or other devices, with which UE 1203 may communicate.

The network management system 1251 may include one or more devices, systems, VNFs, etc., that perform one or more operations described herein, such as one or more of the operations described with respect to the network management system 100.

Figure 13:
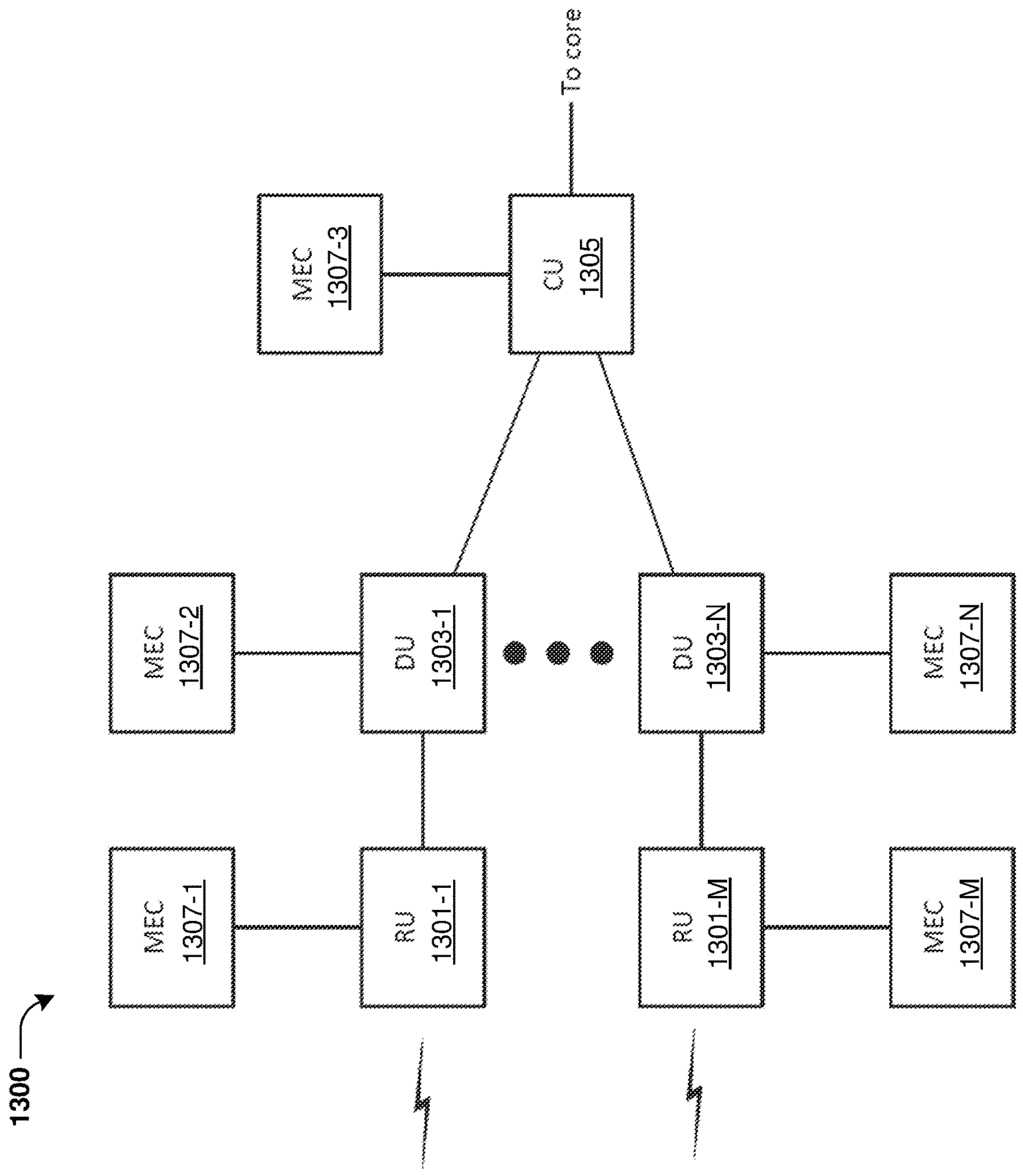
FIG. 13 is an illustration of an example network that may utilize and/or implement at least a portion of the techniques presented herein.

FIG. 13 illustrates an example Distributed Unit ("DU") network 1300, which may be included in and/or implemented by one or more RANs (e.g., RAN 1210, RAN 1212, or some other RAN). In some embodiments, a particular RAN may include one DU network 1300. In some embodiments, a particular RAN may include multiple DU networks 1300. In some embodiments, DU network 1300 may correspond to a particular gNB 1211 of a 5G RAN (e.g., RAN 1210). In some embodiments, DU network 1300 may correspond to multiple gNBs 1211. In some embodiments, DU network 1300 may correspond to one or more other types of base stations of one or more other types of RANs. As shown, DU network 1300 may include Central Unit ("CU") 1305, one or more Distributed Units ("DUs") 1303-1 through 1303-N (referred to individually as "DU 1303," or collectively as "DUs 1303"), and one or more Radio Units ("RUs") 1301-1 through 1301-M (referred to individually as "RU 1301," or collectively as "RUs 1301").

CU 1305 may communicate with a core of a wireless network (e.g., may communicate with one or more of the devices or systems described above with respect to FIG. 12, such as AMF 1215 and/or UPF/PGW-U 1235). In the uplink direction (e.g., for traffic from UEs UE 1203 to a core network), CU 1305 may aggregate traffic from DUs 1303, and forward the aggregated traffic to the core network. In some embodiments, CU 1305 may receive traffic according to a given protocol (e.g., Radio Link Control ("RLC")) from DUs 1303, and may perform higher-layer processing (e.g., may aggregate/process RLC packets and generate Packet Data Convergence Protocol ("PDCP") packets based upon the RLC packets) on the traffic received from DUs 1303.

In accordance with some embodiments, CU 1305 may receive downlink traffic (e.g., traffic from the core network) for a particular UE 1203, and may determine which DU(s) 1303 should receive the downlink traffic. DU 1303 may include one or more devices that transmit traffic between a core network (e.g., via CU 1305) and UE 1203 (e.g., via a respective RU 1301). DU 1303 may, for example, receive traffic from RU 1301 at a first layer (e.g., physical ("PHY") layer traffic, or lower PHY layer traffic), and may process/aggregate the traffic to a second layer (e.g., upper PHY and/or RLC). DU 1303 may receive traffic from CU 1305 at the second layer, may process the traffic to the first layer, and provide the processed traffic to a respective RU 1301 for transmission to UE 1203.

RU 1301 may include hardware circuitry (e.g., one or more RF transceivers, antennas, radios, and/or other suitable hardware) to communicate wirelessly (e.g., via an RF interface) with one or more UEs UE 1203, one or more other DUs 1303 (e.g., via RUs 1301 associated with DUs 1303), and/or any other suitable type of device. In the uplink direction, RU 1301 may receive traffic from UE 1203 and/or another DU 1303 via the RF interface and may provide the traffic to DU 1303. In the downlink direction, RU 1301 may receive traffic from DU 1303, and may provide the traffic to UE 1203 and/or another DU 1303.

RUs 1301 may, in some embodiments, be communicatively coupled to one or more Multi-Access/Mobile Edge Computing ("MEC") devices, referred to sometimes herein simply as ("MECs") 1307. For example, RU 1301-1 may be communicatively coupled to MEC 1307-1, RU 1301-M may be communicatively coupled to MEC 1307-M, DU 1303-1 may be communicatively coupled to MEC 1307-2, DU 1303-N may be communicatively coupled to MEC 1307-N, CU 1305 may be communicatively coupled to MEC 1307-3, and so on. MECs 1307 may include hardware resources (e.g., configurable or provisionable hardware resources) that may be configured to provide services and/or otherwise process traffic to and/or from UE 1203, via a respective RU 1301.

For example, RU 1301-1 may route some traffic, from UE 1203, to MEC 1307-1 instead of to a core network (e.g., via DU 1303 and CU 1305). MEC 1307-1 may process the traffic, perform one or more computations based upon the received traffic, and may provide traffic to UE 1203 via RU 1301-1. In this manner, ultra-low latency services may be provided to UE 1203, as traffic does not need to traverse DU 1303, CU 1305, and an intervening backhaul network between DU network 1300 and the core network. In some embodiments, MEC 1307 may include, and/or may implement some or all of the functionality described above with respect to the second node 130 (e.g., the application server that hosts resources of the first application). Alternatively and/or additionally, MEC 1307 may include, and/or may implement some or all of the functionality described above with respect to the network management system 100.

Figure 14:
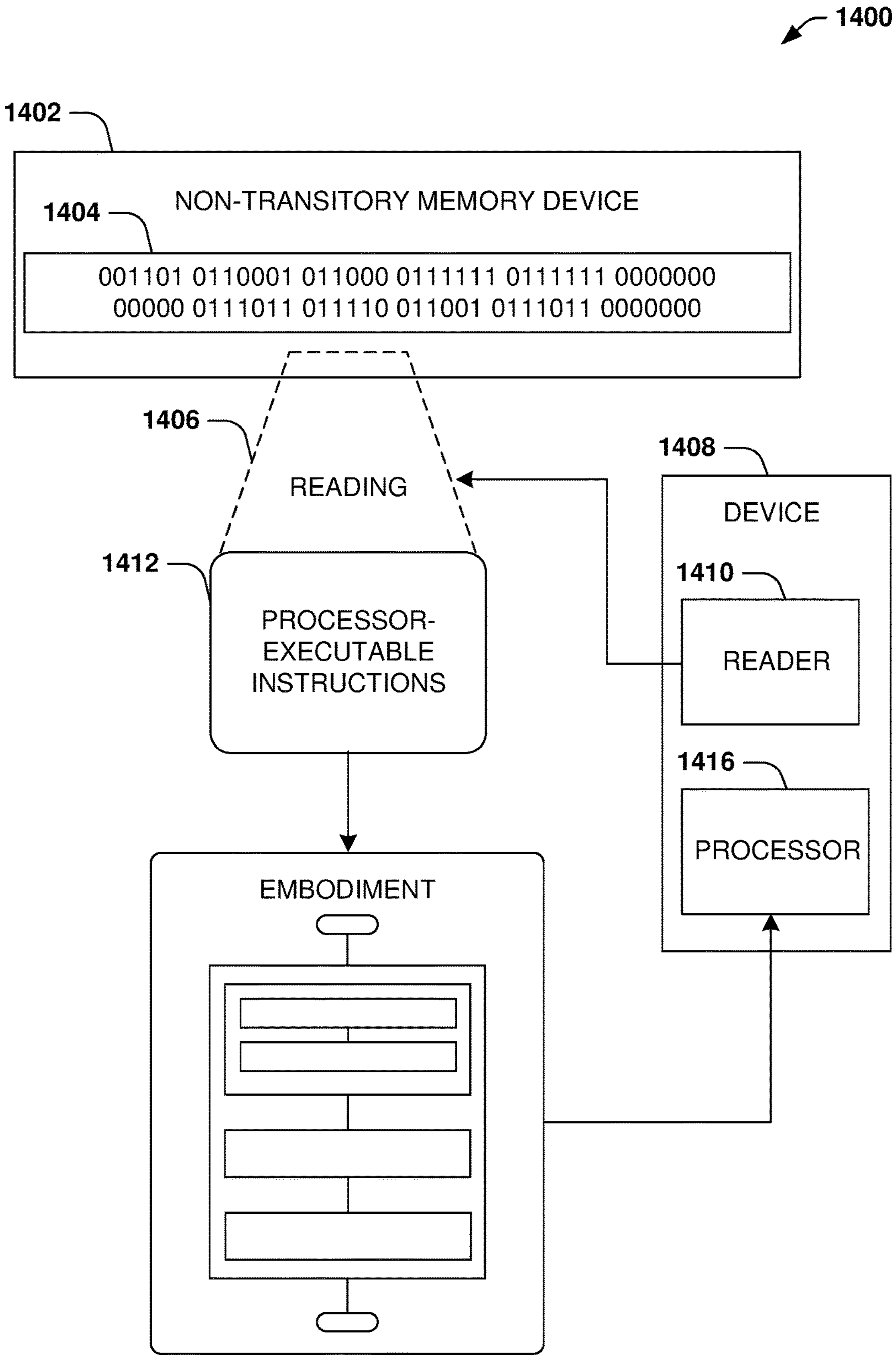
FIG. 14 is an illustration of a scenario featuring an example non-transitory machine readable medium in accordance with one or more of the provisions set forth herein.

FIG. 14 is an illustration of a scenario 1400 involving an example non-transitory machine readable medium 1402. The non-transitory machine readable medium 1402 may comprise processor-executable instructions 1412 that when executed by a processor 1416 cause performance (e.g., by the processor 1416) of at least some of the provisions herein. The non-transitory machine readable medium 1402 may comprise a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a compact disk (CD), a digital versatile disk (DVD), or floppy disk). The example non-transitory machine readable medium 1402 stores computer-readable data 1404 that, when subjected to reading 1406 by a reader 1410 of a device 1408 (e.g., a read head of a hard disk drive, or a read operation invoked on a solid-state storage device), express the processor-executable instructions 1412. In some embodiments, the processor-executable instructions 1412, when executed cause performance of operations, such as at least some of the example method 200 of FIG. 2 and/or the example method 600 of FIG. 6, for example. In some embodiments, the processor-executable instructions 1412 are configured to cause implementation of a system, such as at least some of the example system 101 of FIG. 1, for example.

As used in this application, "component," "module," "system", "interface", and/or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Unless specified otherwise, "first," "second," and/or the like are not intended to imply a temporal aspect, a spatial aspect, an ordering, etc. Rather, such terms are merely used as identifiers, names, etc. for features, elements, items, etc. For example, a first object and a second object generally correspond to object A and object B or two different or two identical objects or the same object.

Moreover, "example" is used herein to mean serving as an example, instance, illustration, etc., and not necessarily as advantageous. As used herein, "or" is intended to mean an inclusive "or" rather than an exclusive "or". In addition, "a" and "an" as used in this application are generally be construed to mean "one or more" unless specified otherwise or clear from context to be directed to a singular form. Also, at least one of A and B and/or the like generally means A or B or both A and B. Furthermore, to the extent that "includes", "having", "has", "with", and/or variants thereof are used in either the detailed description or the claims, such terms are intended to be inclusive in a manner similar to the term "comprising".

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing at least some of the claims.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, many modifications may be made to this configuration without departing from the scope or spirit of the claimed subject matter.

Various operations of embodiments are provided herein. In an embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering may be implemented without departing from the scope of the disclosure. Further, it will be understood that not all operations are necessarily present in each embodiment provided herein. Also, it will be understood that not all operations are necessary in some embodiments.

Also, although the disclosure has been shown and described with respect to one or more implementations, alterations and modifications may be made thereto and additional embodiments may be implemented based upon a reading and understanding of this specification and the annexed drawings. The disclosure includes all such modifications, alterations and additional embodiments and is limited only by the scope of the following claims. The specification and drawings are accordingly to be regarded in an illustrative rather than restrictive sense. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure. In addition, while a particular feature of the disclosure may have been disclosed with respect to only one of several implementations, such feature may be combined with one or more other features of the other implementations as may be desired and advantageous for any given or particular application.

What is claimed is:

1. A method comprising:

determining, by a first node of a network, a packet size modulation profile for use in generating identifiable data packets;

generating, by the first node, a first identifiable data packet, comprising a first encrypted payload, addressed to a second node, wherein generating the first identifiable data packet comprises modulating a first packet size of a first data packet based upon the packet size modulation profile, wherein the first identifiable data packet comprises a first unencrypted header indicating the first packet size;

transmitting, by the first node and over the network, the first identifiable data packet to the second node; and receiving, by the first node and from the second node, a second identifiable data packet, comprising a second encrypted payload and a second unencrypted header indicating a second packet size, corresponding to a reply to the first identifiable data packet, wherein the first identifiable data packet comprising the first encrypted payload and the second identifiable data packet comprising the second encrypted payload are identifiable as a send-reply pair of data packets without using an encryption key based upon the first packet size indicated by the first unencrypted header of the first identifiable data packet and the second packet size indicated by the second unencrypted header of the second identifiable data packet.

2. The method of claim 1, wherein:

the first node comprises a User Equipment (UE); and the second node comprises a Multi-Access Edge Computing (MEC) device.

3. The method of claim 1, further comprising:

determining one or more performance metrics of the network based upon:

identification of the first identifiable data packet and the second identifiable data packet as the send-reply pair of data packets;

one or more first timestamps indicative of one or more first times comprising at least one of:

a time at which the first identifiable data packet is transmitted by the first node; or one or more times at which the first identifiable data packet is at least one of received, processed, or transmitted by one or more primary nodes of the network; and one or more second timestamps indicative of one or more second times comprising at least one of:

a time at which the second identifiable data packet is transmitted by the second node; or one or more times at which the second identifiable data packet is at least one of received, processed, or transmitted by one or more secondary nodes of the network.

4. The method of claim 3, wherein the one or more performance metrics comprise at least one of:

a latency metric;

a jitter metric;

a packet loss metric;

a packet retransmission metric;

an out-of-order (OOO) packet transmission metric; or a bandwidth metric.

5. The method of claim 3, comprising:

performing, based upon the one or more performance metrics, one or more actions to improve network performance associated with at least one of the first node, the second node or an application hosted on the second node.

6. The method of claim 1, wherein:

the first packet size corresponds to a size of the first encrypted payload in the first identifiable data packet; and generating the first identifiable data packet comprises:

determining a first set of bytes for delivery to the second node;

appending one or more additional bytes to the first set of bytes to generate a second set of bytes, wherein a quantity of bytes of the one or more additional bytes is based upon the first packet size and a quantity of bytes of the first set of bytes; and encrypting the second set of bytes to generate the first encrypted payload.

7. The method of claim 1, wherein:

the second packet size of the second identifiable data packet is a function of the first packet size of the first identifiable data packet.

8. The method of claim 1, wherein:

the second packet size of the second identifiable data packet is equal to the first packet size of the first identifiable data packet.

9. The method of claim 1, wherein:

the second identifiable data packet is an echo reply of the first identifiable data packet.

10. A method, comprising:

identifying a first transmission, over a network, of a first identifiable data packet from a first node to a second node, wherein the first identifiable data packet comprises a first encrypted payload and a first unencrypted header indicating a first packet size;

identifying a second transmission, over the network, of a second identifiable data packet from the second node to the first node, wherein the second identifiable data packet comprises a second encrypted payload and a second unencrypted header indicating a second packet size;

determining, without using an encryption key and based upon the first packet size indicated by the first unencrypted header of the first identifiable data packet and the second packet size indicated by the second unencrypted header of the second identifiable data packet, that the first identifiable data packet and the second identifiable data packet are a send-reply pair of data packets;

determining one or more first timestamps associated with the first transmission of the first identifiable data packet;

determining one or more second timestamps associated with the second transmission of the second identifiable data packet; and determining one or more performance metrics, associated with the send-reply pair of data packets, based upon the one or more first timestamps and the one or more second timestamps.

11. The method of claim 10, further comprising:

modifying one or more parameters of one or more components of the network based upon the one or more performance metrics.

12. The method of claim 10, further comprising:

comparing a performance metric, of the one or more performance metrics, with a performance metric threshold; and in response to determining that the performance metric does not meet the performance metric threshold, at least one of:

modifying network resources, of the network, allocated for at least one of the first node or the second node;

switching a network slice assigned to at least one of the first node or the second node;

modifying one or more Quality of Service (QoS) parameters associated with at least one of the first node or the second node; or increasing a priority of traffic of at least one of the first node or the second node.

13. The method of claim 10, wherein determining that the first identifiable data packet and the second identifiable data packet are a send-reply pair of data packets comprises:

analyzing a send-reply pair identification data structure, indicative of a plurality of pairs of packet sizes respectively comprising one or more send packet sizes and one or more reply packet sizes, based upon the first packet size and the second packet size; and determining that the first identifiable data packet and the second identifiable data packet are the send-reply pair of data packets based upon a determination that the first packet size matches a send packet size of a pair of packet sizes of the plurality of pairs of packet sizes and the second packet size matches a reply packet size of the pair of packet sizes of the plurality of pairs of packet sizes.

14. The method of claim 10, wherein:

determining the one or more first timestamps and the one or more second timestamps is performed via one or more first probes connected to one or more nodes of the network;

the one or more performance metrics comprise a first performance metric associated with a first network segment, of the network, between a third node of the one or more nodes and the second node; and the first performance metric is determined based upon:

a first timestamp, of the one or more first timestamps, corresponding to a time at which the first identifiable data packet is at least one of received, processed, or transmitted by the third node; and a second timestamp, of the one or more second timestamps, corresponding to a time at which the second identifiable data packet is at least one of received, processed, or transmitted by the third node.

15. The method of claim 10, wherein:

the first node comprises a User Equipment (UE); and the second node comprises a Multi-Access Edge Computing (MEC) device.

16. The method of claim 10, wherein the one or more performance metrics comprise at least one of:

a latency metric;

a jitter metric;

a packet loss metric;

a packet retransmission metric;

an out-of-order (OOO) packet transmission metric; or a bandwidth metric.

17. A computer comprising:

a processor coupled to memory, the processor configured to execute instructions from the memory to perform operations comprising:

determining a packet size modulation profile for use in generating identifiable data packets;

generating, based upon the packet size modulation profile, a first identifiable data packet having a first packet size, wherein the first identifiable data packet is addressed to a node of a network and comprises a first encrypted payload and a first unencrypted header indicating the first packet size;

transmitting, over the network, the first identifiable data packet to the node; and receiving, from the node, a second identifiable data packet corresponding to a reply to the first identifiable data packet and comprising a second encrypted payload and a second unencrypted header indicating a second packet size, wherein the first identifiable data packet comprising the first encrypted payload and the second identifiable data packet comprising the second encrypted payload are identifiable as a send-reply pair of data packets without using an encryption key based upon the first packet size indicated by the first unencrypted header of the first identifiable data packet and the second packet size indicated by the second unencrypted header of the second identifiable data packet.

18. The computer of claim 17, wherein:

the first packet size corresponds to a size of the first encrypted payload in the first identifiable data packet; and generating the first identifiable data packet comprises:

determining a first set of bytes for delivery to the node;

appending one or more additional bytes to the first set of bytes to generate a second set of bytes, wherein a quantity of bytes of the one or more additional bytes is based upon the first packet size and a quantity of bytes of the first set of bytes; and encrypting the second set of bytes to generate the first encrypted payload.

19. The computer of claim 17, comprising:

performing, based upon identification of the first identifiable data packet and the second identifiable data packet as the send-reply pair of data packets, one or more actions to improve network performance associated with at least one of the node or an application hosted on the node.

20. The computer of claim 17, wherein:

the first identifiable data packet and the second identifiable data packet are identifiable as a send-reply pair of data packets based upon a pair of packet sizes indicated by a send-reply pair identification data structure.

* * * * *